(12) United States Patent
Wang et al.

(10) Patent No.: US 8,215,098 B2
(45) Date of Patent: Jul. 10, 2012

(54) METHOD AND APPARATUS FOR DIAGNOSING EXHAUST GAS AFTERTREATMENT COMPONENT DEGRADATION

(75) Inventors: Yue Yun Wang, Columbus, IN (US); Shyan Huang, Columbus, IN (US); Jerilyn Tsai, Columbus, IN (US)

(73) Assignee: Cummins Inc., Columbus, IN (US)

( * ) Notice: Subject to any disclaimer, the term of this patent is extended or adjusted under 35 U.S.C. 154(b) by 1090 days.

(21) Appl. No.: 11/119,720

(22) Filed: May 2, 2005

(65) Prior Publication Data

US 2006/0242945 A1 Nov. 2, 2006

(51) Int. Cl.
*F01N 3/00* (2006.01)
(52) U.S. Cl. .............. 60/277; 60/276; 60/295; 60/297
(58) Field of Classification Search .............. 60/274, 60/276, 278, 280, 285, 295, 297, 301
See application file for complete search history.

(56) References Cited

U.S. PATENT DOCUMENTS

| | | | |
|---|---|---|---|
| 5,426,934 A * | 6/1995 | Hunt et al. ............. | 60/276 |
| 5,539,638 A | 7/1996 | Keeler et al. | |
| 5,682,317 A | 10/1997 | Keeler et al. | |
| 5,937,638 A | 8/1999 | Akazaki et al. | |
| 6,026,640 A | 2/2000 | Kato et al. | |
| 6,073,440 A | 6/2000 | Douta et al. | |
| 6,134,883 A | 10/2000 | Kato et al. | |
| 6,167,695 B1 * | 1/2001 | Itou et al. ............. | 60/274 |
| 6,216,450 B1 | 4/2001 | Takahashi et al. | |
| 6,233,925 B1 * | 5/2001 | Hirota et al. ............. | 60/285 |
| 6,295,807 B1 | 10/2001 | Douta et al. | |
| 6,389,802 B1 * | 5/2002 | Berger et al. ............. | 60/274 |
| 6,427,438 B1 | 8/2002 | Yasui et al. | |
| 6,460,329 B2 | 10/2002 | Shimotani et al. | |
| 6,484,493 B2 * | 11/2002 | Takanohashi ............. | 60/277 |
| 6,539,705 B2 * | 4/2003 | Beer et al. ............. | 60/274 |
| 6,594,989 B1 * | 7/2003 | Hepburn et al. ............. | 60/286 |
| 6,629,408 B1 | 10/2003 | Murakami et al. | |
| 6,694,724 B2 | 2/2004 | Tanaka et al. | |
| 6,697,729 B2 | 2/2004 | Wright | |
| 6,755,014 B2 * | 6/2004 | Kawai et al. ............. | 60/286 |
| 7,024,850 B2 * | 4/2006 | Nishizawa et al. ............. | 60/277 |
| 7,043,901 B2 * | 5/2006 | Goralski et al. ............. | 60/285 |
| 7,059,112 B2 * | 6/2006 | Bidner et al. ............. | 60/277 |
| 7,150,144 B2 * | 12/2006 | Nakagawa et al. ............. | 60/277 |
| 2001/0032456 A1 | 10/2001 | Yonekura et al. | |
| 2001/0054282 A1 | 12/2001 | Lang et al. | |
| 2002/0007628 A1 | 1/2002 | Bidner et al. | |
| 2003/0041592 A1 | 3/2003 | Nishioka et al. | |
| 2003/0070420 A1 | 4/2003 | Uchida | |
| 2003/0139874 A1 | 7/2003 | Yasui | |
| 2003/0216855 A1 | 11/2003 | Liang et al. | |
| 2004/0000135 A1 | 1/2004 | Uchida | |
| 2004/0006971 A1 | 1/2004 | Kamoto et al. | |
| 2004/0031261 A1 | 2/2004 | Sun et al. | |

\* cited by examiner

*Primary Examiner* — Binh Q Tran
(74) *Attorney, Agent, or Firm* — Barnes & Thornburg LLP

(57) ABSTRACT

A system is provided for diagnosing operation of an exhaust gas aftertreatment component for an internal combustion engine. The system includes a NOx sensor producing a NOx signal indicative of NOx content of exhaust gas exiting the aftertreatment component, and a control circuit configured to estimate as a function of a number of engine operating conditions a NOx inlet content corresponding to a NOx content of exhaust gas produced by the engine and entering the aftertreatment component. The control circuit is configured to determine a NOx conversion efficiency of the aftertreatment component as a function of the NOx signal and of the NOx inlet content, and to determine that the aftertreatment component is degraded if the NOx conversion efficiency is below a threshold value for at least a first predefined time period.

20 Claims, 11 Drawing Sheets

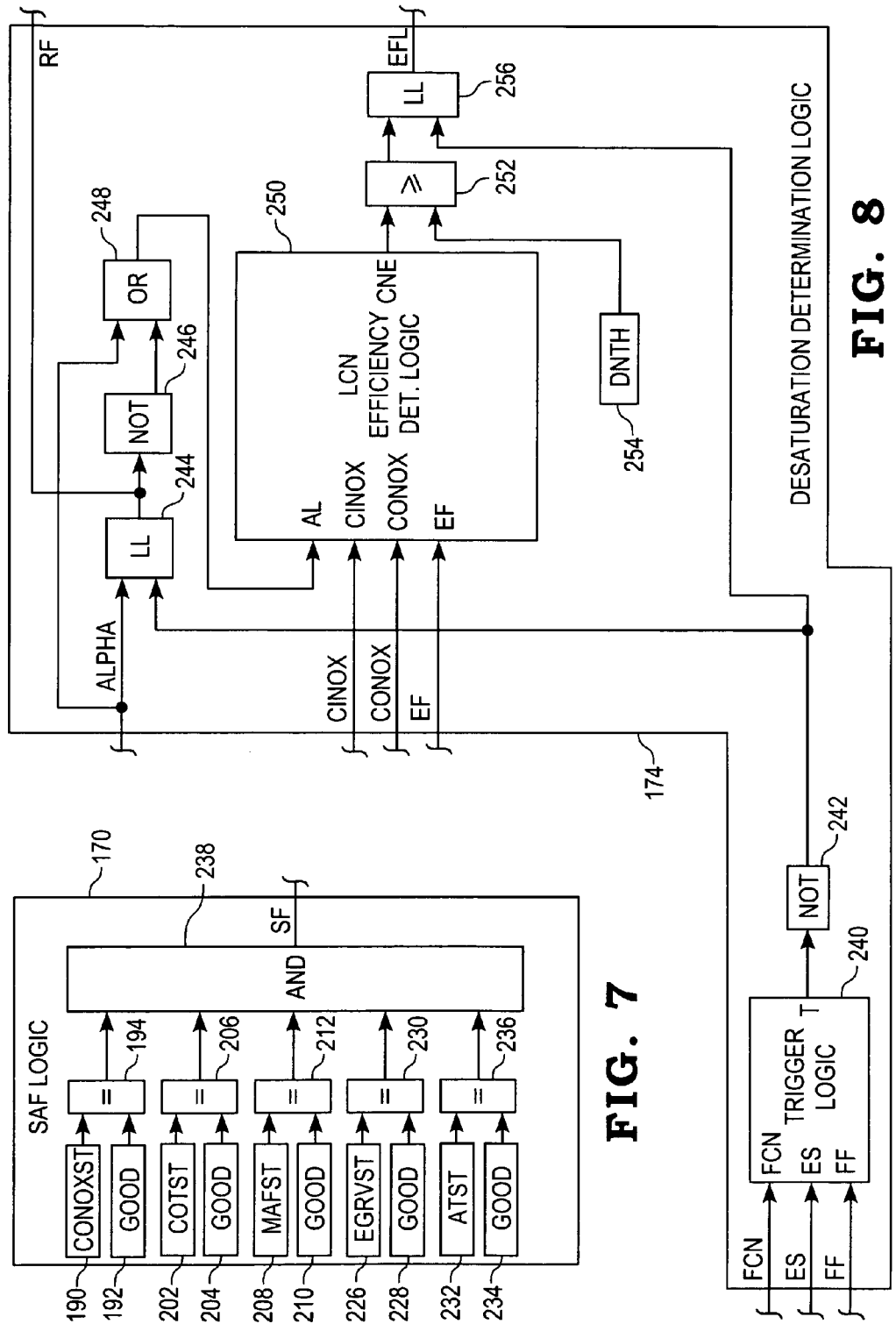

METHOD AND APPARATUS FOR DIAGNOSING EXHAUST GAS AFTERTREATMENT COMPONENT DEGRADATION

FIELD OF THE INVENTION

The present invention relates generally to exhaust gas aftertreatment components for internal combustion engines, and more specifically to techniques for diagnosing degradation of such exhaust gas aftertreatment components.

BACKGROUND

Exhaust gas aftertreatment systems for internal combustion engines may typically include one or more aftertreatment components configured to process the exhaust gas in a manner that removes one or more undesirable constituents from the exhaust gas. It is desirable to monitor the operation of one or more such aftertreatment components to diagnose degradation in the ability of the one or more aftertreatment components to remove the one or more undesirable constituents from the exhaust gas.

SUMMARY

The present invention may comprise one or more of the features recited in the attached claims, and/or one or more of the following features and combinations thereof. A system for diagnosing operation of an exhaust gas aftertreatment component for an internal combustion engine may comprise a NOx sensor producing a NOx signal indicative of NOx content of exhaust gas exiting the aftertreatment component and a control circuit. The control circuit may be configured to estimate as a function of a number of engine operating conditions a NOx inlet content corresponding to a NOx content of exhaust gas produced by the engine and entering the aftertreatment component. The control circuit may be configured to determine a NOx conversion efficiency of the aftertreatment component as a function of the NOx signal and of the NOx inlet content. The control circuit may be configured to determine that the aftertreatment component is degraded if the NOx conversion efficiency is below a threshold value for at least a first predefined time period.

The system may further include an engine speed sensor producing an engine speed signal indicative of rotational speed of the engine, a mass air flow sensor producing a mass air flow signal indicative of a mass flow of fresh air entering the engine, an intake manifold coupled to the engine, an exhaust manifold coupled to the engine, and an EGR conduit fluidly coupled between the exhaust manifold and the intake manifold. The control circuit may be configured to estimate the NOx inlet content as a function of the engine speed signal, the mass air flow signal, a flow rate of fuel supplied to the engine, a fuel timing value and an EGR flow rate value indicative of a flow rate of recirculated exhaust gas through the EGR conduit.

The system may further include an engine speed sensor producing an engine speed signal indicative of rotational speed of the engine, a mass air flow sensor producing a mass air flow signal indicative of a mass flow of fresh air entering the engine, and a pressure sensor producing a pressure signal indicative of ambient air pressure. The control circuit may be configured to estimate the NOx inlet content as a function of the engine speed signal, the mass air flow signal, the pressure signal, a flow rate of fuel supplied to the engine, and a fuel timing signal.

The control circuit may be configured to determine the NOx conversion efficiency further as a function of a flow rate of the exhaust gas entering the aftertreatment component. Such a system may further include an engine speed sensor producing an engine speed signal indicative of rotational speed of the engine, and a mass air flow sensor producing a mass air flow signal indicative of a mass flow of fresh air entering the engine. The control circuit may be configured to determine the flow rate of the exhaust gas entering the aftertreatment component as a function of the engine speed signal, the mass air flow signal and a flow rate of fuel supplied to the engine.

The control circuit may be configured to determine the NOx conversion efficiency of the aftertreatment component by determining from the NOx signal an accumulated aftertreatment component outlet NOx quantity over a second predefined time period, determining from the NOx inlet content an accumulated aftertreatment component inlet NOx quantity over the second predefined time period, and determining the NOx conversion efficiency as a function of a ratio of the accumulated aftertreatment component outlet NOx quantity and the accumulated aftertreatment component inlet NOx quantity. In such a system, the control circuit may be configured to determine the accumulated aftertreatment component outlet NOx quantity as a function of the NOx signal and of a flow rate of exhaust gas entering the aftertreatment component over the second predefined time period. The control circuit may further be configured to determine the accumulated aftertreatment component inlet NOx quantity as a function of the NOx inlet content and of the flow rate of exhaust gas entering the aftertreatment component over the second predefined time period. Such a system may further include an engine speed sensor producing an engine speed signal indicative of rotational speed of the engine, and a mass air flow sensor producing a mass air flow signal indicative of a mass flow of fresh air entering the engine. The control circuit may be configured to determine the flow rate of the exhaust gas entering the aftertreatment component as a function of the engine speed signal, the mass air flow signal and a flow rate of fuel supplied to the engine.

The control circuit may be responsive to an indicator indicating that regeneration of the aftertreatment component is occurring to determine whether the aftertreatment component is saturated as a function of the NOx signal and of the NOx inlet content, and to thereafter determine the NOx conversion efficiency of the aftertreatment component and determine whether the aftertreatment component is degraded only if the aftertreatment component is not saturated. In such a system, the control circuit may be configured to determine whether the aftertreatment component is saturated by determining a lean NOx conversion efficiency of the aftertreatment component as a function of the NOx signal and of the NOx inlet content, and determining that the aftertreatment component is not saturated if the lean NOx conversion efficiency is greater than a first minimum efficiency value and the lean NOx conversion efficiency does not drop below a second minimum efficiency value for more than a second predefined time period. The control circuit may further be configured to determine whether the NOx sensor is faulty and to determine whether any sensor producing sensory information from which the NOx inlet content is estimated is faulty, and to thereafter determine the NOx conversion efficiency of the aftertreatment component and determine whether the aftertreatment component is degraded only if the NOx sensor is not faulty and no sensor producing sensory information from which the NOx inlet content is estimated is faulty.

The system may further include a temperature sensor producing a temperature signal indicative of a temperature of exhaust gas exiting the aftertreatment component. In such a system, the control circuit may be configured to determine the NOx conversion efficiency of the aftertreatment component and determine whether the aftertreatment component is degraded only if the temperature signal indicates that the temperature of the exhaust gas exiting the aftertreatment component is within a predefined temperature range and a flow rate of exhaust gas entering the aftertreatment component is within a predefined flow rate range. Such a system may further include an engine speed sensor producing an engine speed signal indicative of rotational speed of the engine, and a mass air flow sensor producing a mass air flow signal indicative of a mass flow of fresh air entering the engine. The control circuit may be configured to determine the flow rate of the exhaust gas entering the aftertreatment component as a function of the engine speed signal, the mass air flow signal and a flow rate of fuel supplied to the engine. The control circuit may further be responsive to an indicator indicating that regeneration of the aftertreatment component is occurring to determine whether the aftertreatment component is saturated as a function of the NOx signal and of the NOx inlet content, and to thereafter determine the NOx conversion efficiency of the aftertreatment component and determine whether the aftertreatment component is degraded only if the aftertreatment component is not saturated. The control circuit may further be configured to determine the NOx conversion efficiency of the aftertreatment component and determine whether the aftertreatment component is degraded only if the temperature of the exhaust gas exiting the aftertreatment component has been within a predefined temperature range, the flow rate of exhaust gas entering the aftertreatment component has been within the predefined flow rate range and the aftertreatment component has not been saturated for at least a second predefined time period. The system may further include a key switch having at least an on position and an off position. In such a system the control circuit may further be configured to determine the NOx conversion efficiency of the aftertreatment component and determine whether the aftertreatment component is degraded only if the temperature of the exhaust gas exiting the aftertreatment component has been within a predefined temperature range, the flow rate of exhaust gas entering the aftertreatment component has been within the predefined flow rate range and the aftertreatment component has not been saturated for at least a second predefined time period, and the key switch is in the on position.

The control circuit may be configured to determine the threshold value as a function of a bed temperature of the aftertreatment component and of a flow rate of exhaust gas entering the aftertreatment component. Such a system may further include an aftertreatment component inlet temperature sensor producing an inlet temperature signal indicative of a temperature of exhaust gas entering the aftertreatment component, and an aftertreatment component outlet temperature sensor producing an outlet temperature signal indicative of a temperature of exhaust gas exiting the aftertreatment component. The control circuit in such a system may be configured to determine the bed temperature of the aftertreatment component as a function of the temperature inlet signal and of the temperature outlet signal. The system may further include an engine speed sensor producing an engine speed signal indicative of rotational speed of the engine, and a mass air flow sensor producing a mass air flow signal indicative of a mass flow of fresh air entering the engine. In such a system, the control circuit may be configured to determine the flow rate of exhaust gas entering the aftertreatment component as a function of the engine speed signal, the mass air flow signal and a flow rate of fuel supplied to the engine.

The system may further include a memory. In such a system, the control circuit may be configured to log a fault in the memory after determining that the aftertreatment component is degraded. The control circuit may be alternatively or additionally configured to store the NOx conversion efficiency in the memory after determining that the aftertreatment component is degraded.

A method for diagnosing operation of an exhaust gas aftertreatment component for an internal combustion engine may comprise determining from information provided by a NOx sensor a NOx outlet value corresponding to a NOx content of exhaust gas exiting the aftertreatment component, estimating as a function of a number of engine operating conditions a NOx inlet value corresponding to a NOx content of exhaust gas produced by the engine and entering the aftertreatment component, determining a NOx conversion efficiency of the aftertreatment component as a function of the NOx outlet value and of the NOx inlet value, and determining that the aftertreatment component is degraded if the NOx conversion efficiency is below a threshold value for at least a first predefined time period.

The method may further include determining a rotational speed of the engine, determining a mass flow rate of fresh air entering the engine, determining a flow rate of recirculated exhaust gas supplied to an intake manifold of the engine, and estimating the NOx inlet value as a function of the rotational speed, the mass flow rate of fresh air, the flow rate of recirculated exhaust gas, a flow rate of fuel supplied to the engine and a fuel timing value.

Alternatively, the method may further include determining a rotational speed of the engine, determining a mass flow rate of fresh air entering the engine, determining ambient air pressure, and estimating the NOx inlet value as a function of the rotational speed, the mass flow rate of fresh air, the ambient air pressure, a flow rate of fuel supplied to the engine and a fuel timing value.

Determining a NOx conversion efficiency of the aftertreatment component may include determining the NOx conversion efficiency further as a function of a flow rate of exhaust gas entering the aftertreatment component. Such a method may further include determining a rotational speed of the engine, determining a mass flow rate of fresh air entering the engine, and determining the flow rate of the exhaust gas entering the aftertreatment component as a function of the rotational speed, the mass flow rate of fresh air and a flow rate of fuel supplied to the engine.

The method may further include determining whether the aftertreatment component is saturated as a function of the NOx outlet value and of the NOx inlet value, and determining the NOx conversion efficiency and determining whether the aftertreatment component is degraded only if the aftertreatment component not saturated.

The method may further include determining the threshold value as a function of a bed temperature of the aftertreatment component and of a flow rate of exhaust gas entering the aftertreatment component. Such a method may further include determining an inlet temperature corresponding to a temperature of exhaust gas entering the aftertreatment component, determining an outlet temperature corresponding to a temperature of exhaust gas exiting the aftertreatment component, and determining the bed temperature of the aftertreatment component as a function of the inlet temperature and of the outlet temperature. The method may alternatively or additionally include determining a rotational speed of the engine, determining a mass flow rate of fresh air entering the engine, and determining the flow rate of the exhaust gas entering the aftertreatment component as a function of the rotational speed, the mass flow rate of fresh air and a flow rate of fuel supplied to the engine.

The method may further include logging a fault in a memory if the aftertreatment component is degraded. Such a method may further include storing the NOx conversion efficiency in the memory if the aftertreatment component is degraded.

BRIEF DESCRIPTION OF THE DRAWINGS

FIG. 7 is a block diagram of one illustrative embodiment of the sensor actuator fault logic block of FIG. 6.

FIG. 8 is a block diagram of one illustrative embodiment of the desaturation determination logic block of FIG. 6.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
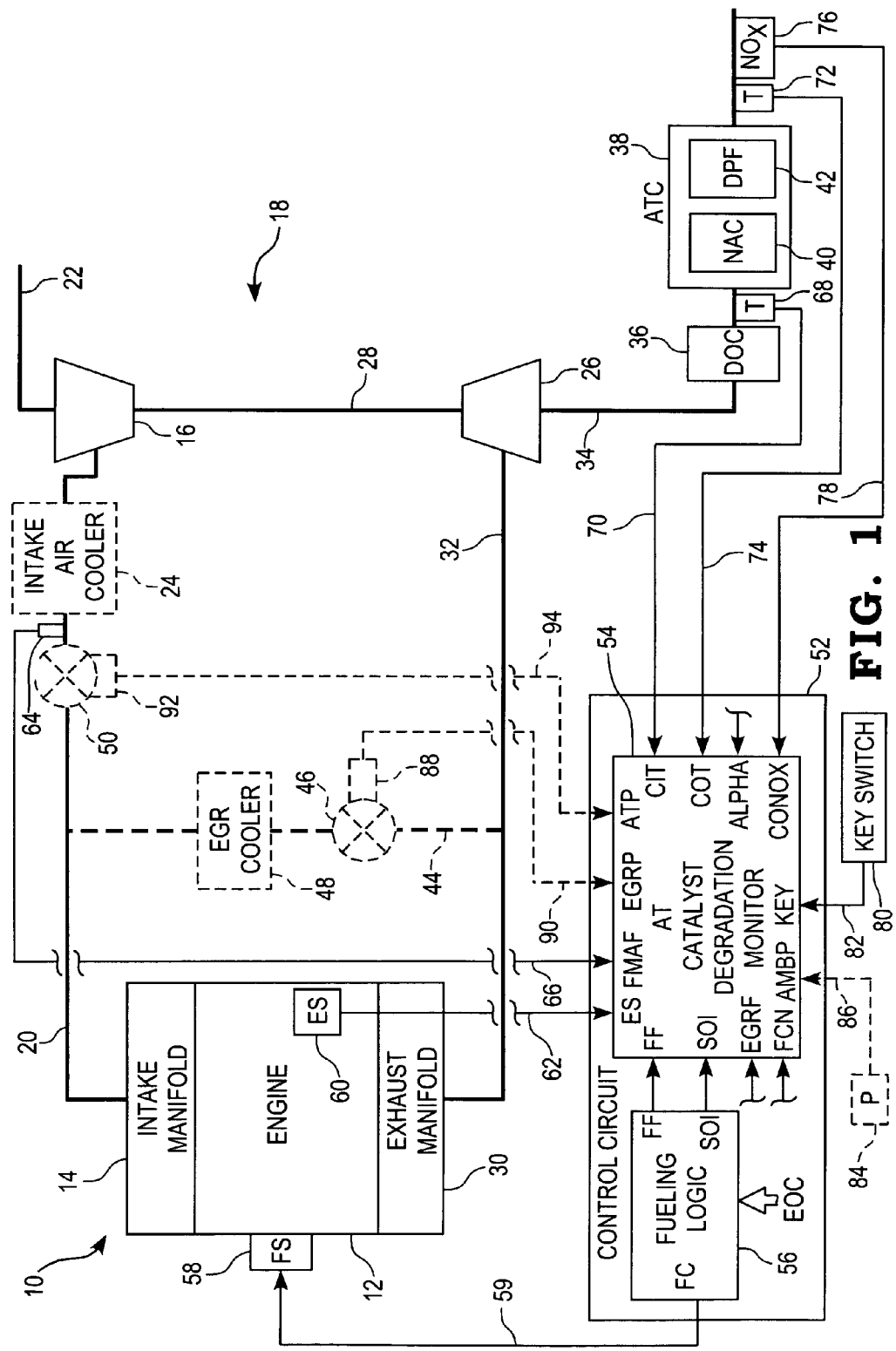
FIG. 1 is a diagram of one illustrative embodiment of a system for diagnosing exhaust gas aftertreatment component degradation.

Referring now to FIG. 1, one illustrative embodiment of a system 10 for diagnosing exhaust gas aftertreatment component degradation is shown. In the illustrated embodiment, the system 10 includes an internal combustion engine 12 having an intake manifold 14 fluidly coupled to a fresh air outlet of a compressor 16 of a turbocharger 18 via conduit 20. A fresh air inlet of the compressor 16 is fluidly coupled to a fresh air intake conduit 22. An intake air cooler 24 may optionally be disposed in-line with the intake air conduit 20 adjacent to the fresh air outlet of the compressor 16 to cool the fresh air supplied by the compressor 16. A turbine 26 of the turbocharger 18 is mechanically coupled via a rotational drive shaft 28 to the compressor 16 in a conventional manner. An exhaust gas inlet of the turbine 26 is fluidly coupled to an exhaust manifold 30 of the engine 12 via an exhaust gas conduit 32. An exhaust gas outlet of the turbine 26 is fluidly coupled to an exhaust gas inlet of a diesel oxidation catalyst (DOC) 36 via an exhaust gas conduit 34. Alternatively or additionally, another diesel oxidation catalyst, or so-called close-coupled catalyst (not shown), may be disposed in-line with the exhaust gas conduit 32 adjacent to the exhaust manifold 30. The diesel oxidation catalyst 36 and/or close-coupled catalyst (not shown), in any case, includes a conventional catalyst element responsive to hydrocarbons introduced into the exhaust gas stream to elevate the temperature of the exhaust gas to a temperature suitable for regeneration of one or more downstream exhaust gas aftertreatment components. An example of one such aftertreatment component 38 illustrated in FIG. 1, and is disposed in-line with the exhaust gas conduit 34 between the DOC 36 and ambient. In the illustrated embodiment, the exhaust gas aftertreatment component (ATC) 38 includes a NOx adsorber catalyst (NAC) 40 followed by a downstream diesel particulate filter (DPF) 42. For purposes of this document, the exhaust aftertreatment component 38 may include more or fewer component elements in any desired order relative to the direction of exhaust gas flow, although it will in all cases include at least the NOx adsorber catalyst (NAC) 40.

In one embodiment, the system 10 may further include an exhaust gas recirculation (EGR) conduit 44 fluidly coupled between the exhaust gas conduit 32 and the air intake conduit 20. In this embodiment, an EGR valve 46 is disposed in-line with the EGR conduit 44, and may be controlled in a conventional manner to control the flow of exhaust gas from the exhaust gas conduit 32 to the intake manifold 14 of the engine 12. Optionally, an EGR cooler 48 may be disposed in-line with the EGR conduit 44, between the EGR valve 46 and the intake air conduit 20, to cool the exhaust gas flowing through the EGR conduit 44 prior to introducing the recirculated exhaust gas into the air intake conduit 20. The control concepts described herein are also applicable to non-EGR engines, and the EGR components 44, 46, and 48 are accordingly shown in phantom in FIG. 1 to indicate that these components may or may not be included. Although the turbocharger 18 and its various components are not shown in phantom in FIG. 1, it will be understood that the control concepts described herein do not strictly require a turbocharger, and in some embodiments the turbocharger 18 may accordingly be omitted. In such cases, the air intake conduit 20 is fluidly coupled directly to the air intake conduit 22, and the exhaust gas conduit 32 is fluidly coupled directly to the exhaust gas conduit 34. Also shown in phantom in FIG. 1 is a conventional intake air throttle 50 disposed in-line with the intake air conduit 20. In embodiments that include the EGR components 44, 46 and 48, the intake air throttle 50 is located upstream of the junction of the EGR conduit 44 and the intake air conduit 20. The intake air throttle 50 may be controlled in a conventional manner to actively control the flow of fresh air into the intake manifold 14.

The system 10 further includes a control circuit 52 configured to control the overall operation of the engine 12 as well as any associated air handling components, such as the EGR valve 46 and the air intake throttle 50, if either or both such components are included. In one embodiment, the control circuit 52 is a microprocessor-based control circuit typically referred to as an electronic or engine control module (ECM), or electronic or engine control unit (ECU). It will be understood, however, that the control circuit 52 may generally be or include one or more general purpose or application specific control circuits arranged and operable as will be described hereinafter.

In the illustrated embodiment, the control circuit 52 includes, or is coupled to, a memory unit (not shown) that stores therein a number of software algorithms executable by the control circuit 52 to control various operations of the engine 12 and any associated air handling components. One control structure defined by one or more such software algorithms is an aftertreatment catalyst degradation monitor block 54, one embodiment of which will be described in detail hereinafter. Another control structure defined by one or more such software algorithms is a fueling logic control block 56 which is responsive to a number of engine operating conditions to determine appropriate fueling commands in a conventional manner. A conventional fuel system 58 is coupled to the engine 12, and is electrically connected to the control circuit 52 by one or more signal paths 59. The control circuit 52 provides the fueling commands to the fuel system 58 via the one or more signal paths 59 to thereby control the fuel system 58 in a conventional manner to supply fuel to the engine 12. The fueling commands produced by such fueling logic 56 include a fuel flow rate (FF) component, typically an $mm^3$/stroke, which corresponds to a flow rate of fuel supplied by the fuel system 58 to the engine 12, and a start-of-injection (SOI) component, typically in degrees relative to a reference crank angle, which corresponds to the timing of fuel supplied by the fuel system 58 to the engine 12 relative to a timing reference.

The aftertreatment catalyst degradation monitor block 54 includes a number of inputs receiving signals, commands, and/or values corresponding to various operating conditions of the engine 12, one or more air handling operational signals in embodiments of the system 10 that include corresponding air handling control mechanisms, and operating signals and/or values relating to operation of the aftertreatment component 38. For example, the engine 12 includes an engine speed sensor 60 electrically connected to an engine speed input (ES) of the monitor block 54 via a signal path 62. In one embodiment, the engine speed sensor 60 is a Hall-effect sensor producing a signal on signal path 62 that is indicative of engine speed and crank angle relative to a reference crank angle; e.g., top-dead-center (TDC). Alternatively, any conventional sensor may be used; e.g., variable reluctance sensor or the like, operable to produce a signal on signal path 62 that is indicative of the rotational speed of the engine 12. In such embodiments, however, another sensor or technique will typically be required to determine engine position in the form of a crank angle relative to a reference crank angle.

The system 10 further includes a mass air flow sensor 64 positioned in fluid communication with the air intake conduit 20 and electrically coupled to a fresh mass airflow input, FMAF, of the monitor block 54 via a signal path 66. In embodiments that do not include the EGR components 44, 46, and 48, the mass airflow sensor 64 may be positioned anywhere along the air intake conduit 20 or in fluid communication with the intake manifold 14. In embodiments that do include the EGR components 44, 46, and optionally 48, the mass airflow sensor 64 is positioned upstream of the junction of the EGR conduit 44 and the air intake conduit 20 as illustrated in FIG. 1. In either case, the mass airflow sensor 64 is a conventional sensor operable to produce a fresh mass airflow signal on signal path 66 that is indicative of the flow rate of fresh air through the intake air conduit 20.

The system 10 further includes aftertreatment component inlet exhaust gas temperature sensor 68 in fluid communication with the exhaust gas conduit 34 between the DOC 36 and the aftertreatment component 38, and electrically connected to a catalyst inlet temperature input, CIT, of the monitor block 54 via a signal path 70. The temperature sensor 68 may be a conventional sensor, and is operable to produce a temperature signal on signal path 70 that is indicative of the exhaust gas temperature at the inlet of the aftertreatment component 38.

The system 10 further includes an exhaust gas temperature sensor 72 in fluid communication with the exhaust gas conduit 34 near the exhaust gas outlet of the aftertreatment component 38, and electrically connected to a catalyst outlet temperature input, COT, of the monitor block 54 via a signal path 74. The temperature sensor 72 may be a conventional sensor, and is operable to produce a temperature signal on signal path 74 that is indicative of the temperature of the exhaust gas exiting the aftertreatment component 38.

The system 10 further includes a NOx sensor 76 in fluid communication with the exhaust gas conduit 34 near the exhaust gas outlet of the aftertreatment component 38, and electrically connected to a catalyst outlet NOx input, CONOX, of the monitor block 54 via a signal path 78. The NOx sensor 76 may be a conventional sensor, and is operable to produce a NOx signal on signal path 78 that is indicative of the NOx content of the exhaust gas exiting the aftertreatment component 38.

The system 10 further includes a key switch 80 that is electrically connected to a key input, KEY, of the monitor block 54 via a signal path 82. The key switch 80 is a conventional key switch typically provided in the cab area of a vehicle, and may include "off", "on", and "start" positions. The key switch 80 is typically transitionable from its "off" state to its "on" state and then to its "start" state to start the engine 12. Once the engine 12 is started and running, the key switch generally assumes its "on" position. The engine 12 may then be stopped or turned off by transitioning the key switch 80 from the "on" position to the "off" position in a conventional manner.

In one embodiment, the system 10 may further include a pressure sensor 84 that is electrically connected to an ambient pressure input, AMBP, of the monitor block 54 via a signal path 86. The pressure sensor 84 may be a conventional sensor, and is operable to produce a pressure signal on signal path 86 that is indicative of ambient pressure. Not all embodiments of the system 10 require the pressure sensor 84, and it is accordingly illustrated in phantom in FIG. 1.

In embodiments of the system 10 that include the EGR conduit 44 and EGR valve 46, the system 10 further includes an EGR valve position sensor 88 operatively coupled to the EGR valve 46 and electrically connected to an EGR position input, EGRP, of the monitor block 54 via a signal path 90. The position sensor 88 may be a conventional sensor, and is operable to produce a position signal on signal path 90 that is indicative of a position of the EGR valve 46 relative to a reference EGR valve position.

In embodiments of the system 10 that include an intake air throttle 50, the system 10 further includes an intake air throttle position sensor 92 operatively coupled to the air intake throttle 50 and electrically connected to an intake air throttle position input, ATP, of the monitor block 54 via a signal path 94. The position sensor 92 may be a conventional sensor, and is operable to produce a position signal on signal path 94 that is indicative of the position of the intake air throttle 50 relative to a reference position.

The monitor block 54 further receives a number of operating values that are sensed and/or generated internally to the control circuit 52 pursuant to one or more existing software algorithms. For example, in embodiments of the system 10 that include the EGR components 44, 46 and 48, the control circuit 52 is configured to determine an EGR flow rate, EGRF, either via one or more appropriate flow rate sensors or via an estimation algorithm operable to estimate the EGR flow rate as a function of one or more other operating parameters. In either case, the EGR flow rate value, EGRF, corresponding to the flow rate of exhaust gas flowing through the EGR conduit 44, is provided by the control circuit 52 to the monitor block 54. As another example, the control circuit 52 is operable to determine and provide an operating value, ALPHA, to the monitor block 54, wherein the value of ALPHA is indicative of whether or not the aftertreatment component 38 is being actively or controllably regenerated. In one embodiment, ALPHA is a "1" or "true" if the aftertreatment component 38 is being actively regenerated, and is otherwise a "0" or "false." As a further example, the control circuit 52 is operable to determine and provide a fuel consumed value, FCN, to the monitor block 54. The fuel consumed value, FCN, corresponds to the quantity of fuel consumed during lean operation. FCN thus accumulates only during lean operation, and is reset after each complete regeneration of the aftertreatment component 38.

The aftertreatment catalyst degradation monitor block 54 is operable to generally monitor the operation of the aftertreatment catalyst 38, and more specifically to monitor the operation of the NOx adsorber catalyst (NAC) 40, and determine whether the aftertreatment component 38 and/or catalyst 40 has degraded. As will be described in greater detail hereinafter, the aftertreatment catalyst degradation monitor block 54 is operable to estimate, as a function of a number of engine operating conditions, a NOx inlet content corresponding to a NOx content of the exhaust gas produced by the engine 12 and entering the aftertreatment component 38. The monitor block 54 is then operable to determine a NOx conversion efficiency of the aftertreatment component 38 as a function of the estimated NOx inlet content and of the NOx signal produced by the NOx sensor 76, which corresponds to the NOx content of the exhaust gas exiting the aftertreatment component 38. The monitor block 54 is then operable to determine that the aftertreatment component 38 is degraded if the NOx conversion efficiency is below a threshold value for at least a predefined time period.

Referring now to FIGS. 2-18, details relating to one illustrative embodiment of the aftertreatment catalyst degradation monitor block 54 of FIG. 1 will now be described. It will be understood that the control and logic blocks illustrated in FIGS. 2-18 generally represent software structures within the control circuit 52, and that the control strategy illustrated in FIGS. 2-18 will typically be implemented in the form of one or more software algorithms stored within a memory unit of the control circuit 52 and executable by the control circuit 52 in a conventional manner to effectuate the illustrated control strategy.

Figure 2:
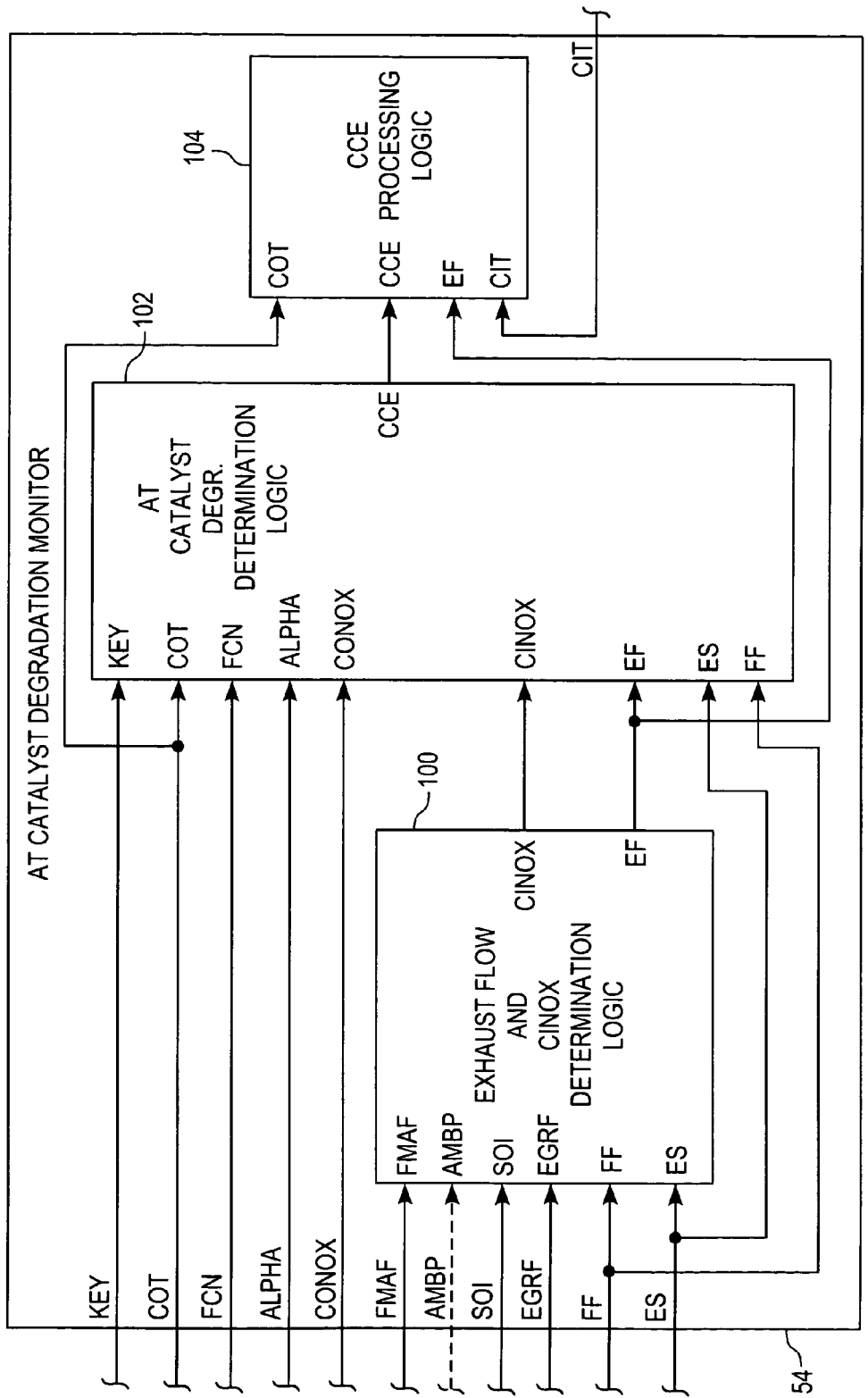
FIG. 2 is a block diagram of one illustrative embodiment of the aftertreatment catalyst monitor block of FIG. 1.

Referring specifically to FIG. 2, the illustrated embodiment of the aftertreatment catalyst degradation monitor block 54 includes an exhaust flow and catalyst inlet NOx determination logic block 100 receiving as inputs the fresh mass airflow signal, FMAF, produced by the sensor 64, the engine speed signal, ES, produced by the sensor 60, the fuel flow rate value, FF, and the start-of-injection value, SOI, produced by the fueling logic block 56, and the EGR fraction value, EGRF, provided by the control circuit 52 to the monitor block 54 as described with respect to FIG. 1. In an alternative embodiment, the exhaust flow and catalyst inlet NOx determination logic block 100 may further receive the ambient pressure signal, AMBP, produced by the sensor 84, as shown in phantom in FIG. 2. In this embodiment, the ambient pressure signal will be used in place of the EGR fraction value, EGRF, and the EGRF input to the block 100 may consequently be omitted. In any case, the exhaust flow and catalyst inlet NOx determination logic block 100 is operable to process the various input signals and values, and produce an estimated catalyst inlet NOx value, CINOX, and an exhaust flow value, EF. The catalyst inlet NOx value, CINOX, corresponds to an estimate of a NOx content of the exhaust gas produced by the engine 12 and entering the exhaust gas inlet of the aftertreatment component 38. The exhaust flow value, EF, corresponds to a flow rate of the exhaust gas through the various exhaust gas components including the exhaust gas conduit 32, the exhaust gas conduit 34, the DOC 36, and the aftertreatment component 38.

The aftertreatment catalyst degradation monitor block 54 further includes an aftertreatment catalyst degradation determination logic block 102 receiving as inputs the catalyst inlet NOx value, CINOX, and the exhaust flow value, EF, produced by the exhaust flow and catalyst inlet NOx determination logic block 100. The logic block 102 further receives as input signals the key switch signal, KEY, produced by the key switch 80, the catalyst output temperature signal, COT, produced by the temperature sensor 72, the catalyst outlet NOx signal, CONOX, produced by the NOx sensor 76, and the engine speed signal, ES, produced by the engine speed sensor 60. The logic block 102 further receives as inputs the fuel consumed value, FCN, generated internally to the control circuit 52, the alpha value, ALPHA, generated internally to the control circuit 52, and the fuel flow value, FF, produced by the fueling logic block 56 of FIG. 1. The aftertreatment catalyst degradation determination logic block 102 is operable to process the foregoing input signals and values, and produce a cumulative catalyst efficiency value, CCE, as its output.

The aftertreatment catalyst degradation monitor block 54 further includes a cumulative catalyst efficiency processing logic block 104 receiving as inputs the catalyst outlet temperature signal, COT, produced by the temperature sensors 72, the cumulative catalyst efficiency value, CCE, produced by the aftertreatment catalyst degradation determination logic block 102, the exhaust flow value, EF, produced by the exhaust flow and catalyst inlet NOx determination logic block 100, and the catalyst inlet temperature signal (CIT) produced by the temperature sensor 68. The cumulative catalyst efficiency processing logic block 104 is operable to process these various input signals and values, and make a determination as to whether the aftertreatment component 38 is degraded.

Figure 3:
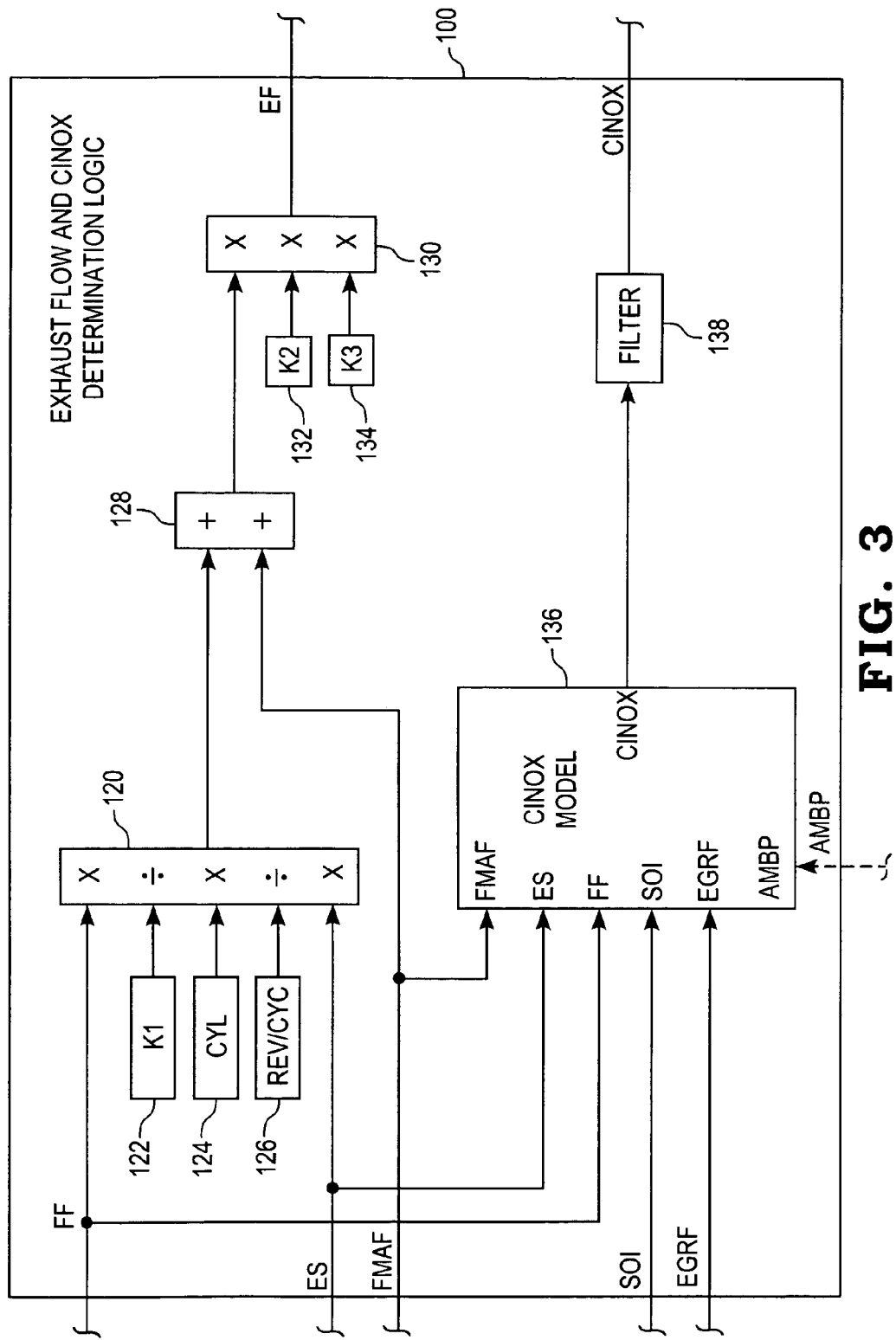
FIG. 3 is a block diagram of one illustrative embodiment of the exhaust flow and CINOX determination logic block of FIG. 2.

Referring now to FIG. 3, a block diagram of one illustrative embodiment of the exhaust flow and catalyst inlet NOx determination logic block 100 of FIG. 2 is shown. In the illustrated embodiment, the block 100 includes an arithmetic block 120 having a first multiplication input receiving the fuel flow rate value, FF, and a second multiplication input receiving the engine speed signal, ES. A first division input receives a constant, K1, stored in a memory block 122, and a second division input receives a second constant, REV/CYC, stored in a memory block 126. Another constant, CYL, is stored in a memory block 124 and is provided to a third multiplication input of the arithmetic block 120. The arithmetic block 120 is operable to convert fuel flow rate, FF, from units of mm$^3$/stroke to lbm/min. In this regard, the constant K1 may have a value of 540476.19, which is a constant conversion factor having units of mm$^3$/lbm, while CYL corresponds to the number of cylinders in the engine 12; e.g., six, and REV/CYC corresponds to crank shaft revolutions per engine cycle; e.g., two. The fuel flow rate, FF, in units of lbm/min produced by the arithmetic block 120 is provided to an addition input of another arithmetic block 128 having a second addition input receiving the fresh mass airflow rate signal, FMAF, produced by the mass airflow sensor 64. The output of the arithmetic block 128 corresponds to the exhaust gas flow rate in units of lbm/min, and is provided to a first multiplication input of a further arithmetic block 130. A second multiplication input of the arithmetic block 130 receives a constant, K2, stored in a memory block 132, and a third multiplication input receives a constant, K3, stored in a memory block 134. The output of the arithmetic block 130 is the exhaust flow value, EF, and is provided in units of grams per hour (g/hr). In this regard, K2 is a conversion constant for converting kilograms to pounds; e.g., 0.4535924, and K3 is a constant conversion constant for converting minutes to hours; e.g., 60.

The exhaust flow and catalyst inlet NOx determination logic block 100 further includes a catalyst inlet NOx model block 136 producing an estimated catalyst inlet NOx value, CINOX, that is passed through a first-order filter block 138, which produces the catalyst inlet NOx value, CINOX, that is provided to the aftertreatment catalyst degradation determination logic block 102 of FIG. 2. In embodiments of the system 10 that include the EGR conduit 44 and EGR valve 46, the catalyst inlet NOx model block 130 may receive as inputs the fresh mass airflow signal, FMAF, produced by the mass airflow sensor 64, the engine speed signal, ES, produced by the engine speed sensor 60, the fuel flow value, FF, and start-of-injection value, SOI, produced by the fueling logic block 56, and the EGR fraction value, EGRF, supplied by the control circuit 52 as described with respect to FIG. 1. In embodiments of the system 10 that do not include the EGR conduit 44 and EGR valve 46, and/or any embodiments of the system 10 that otherwise include an ambient pressure sensor 84, the EGR fraction input, EGRF, to the catalyst inlet NOx model block 136 may be replaced with the ambient pressure signal, AMBP, produced by the sensor 84.

Figure 4:
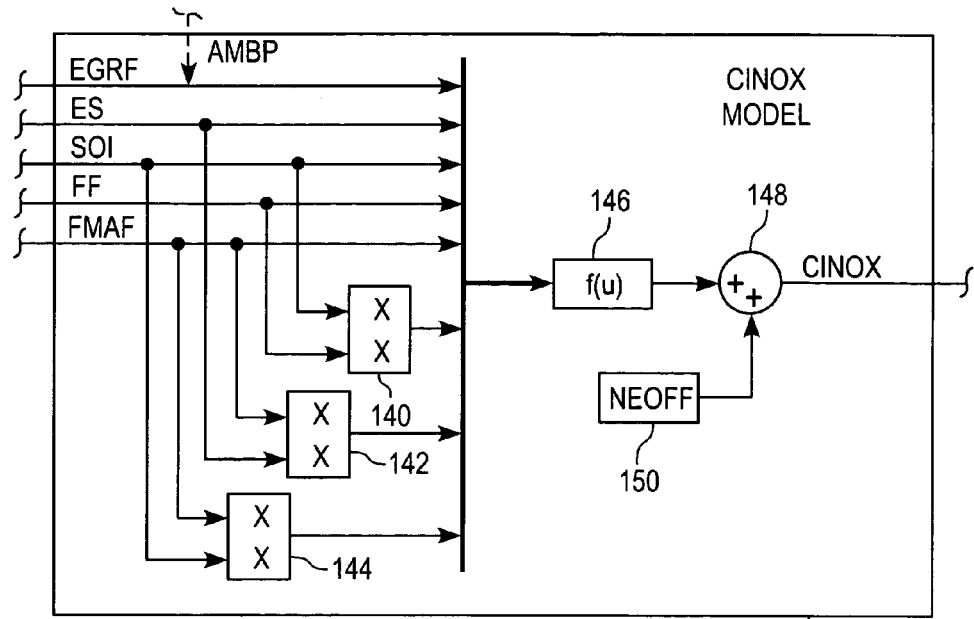
FIG. 4 is a block diagram of one illustrative embodiment of the CINOX model block of FIG. 3.

Referring now to FIG. 4, a block diagram of one illustrative embodiment of the catalyst inlet NOx model block 136 of FIG. 3 is shown. In the illustrated embodiment, the EGR fraction value, EGRF, the engine speed signal, ES, the start-of-injection value, SOI, the fuel flow value, FF, and the fresh mass airflow signal, FMAF, are all provided to a function block 146. Additionally, a multiplication block 140 has a first input receiving the SOI value and the FF value and provides an output to the function block 146 that is the product of SOI and FF. Another multiplication block 142 is provided and has a first input receiving the fresh mass airflow signal, FMAF, and the engine speed signal, ES, and provides an output to the function block 146 that is the product of FMAF and ES. Yet another multiplication block 144 is provided and includes a first input receiving the fresh mass airflow signal, FMAF, and a second multiplication input receiving the start-of-injection value, SOI, and provides an output to the function block 146 that is a product of FMAF and SOI. In an alternate embodiment, as described hereinabove, the ambient pressure signal, AMBP, may replace the EGR fraction value, EGRF. In any case, the function block 146 is operable to produce a raw estimated catalyst inlet NOx value, CINOX$_R$, as a function of its various input values. As one specific example, the function block 146 may be configured to estimate CINOX$_R$ according to the function CINOX$_R$=a1*EGRF+a2*ES+a3*SOI+a4*FF+a5*FMAF+a6*(SOI*FF)+a7*(ES*FMAF)+a8*(SOI*FMAF), wherein a1-a8 are model constants. In embodiments wherein EGRF is replaced by AMBP, the function block 146 may instead be configured in the specific example to estimate CINOX$_R$ according to the equation CINOX$_R$=b1*AMBP+b2*ES+b3*SOI+b4*FF+b5*FMAF+b6*(SOI*FF)+b7*(ES*FMAF)+b8*(SOI*FMAF), wherein b1-b8 are model constants. The CINOX model block 136 further includes a summation block 148 having a first input receiving the output of the function block 146 and a second input receiving a NOx estimate offset value, NEOFF, stored in a memory block 150. The sum of the catalyst inlet NOx value produced by the function block 146 and the NOx estimate offset value, NEOFF, is the estimated catalyst inlet NOx value, CINOX, produced by the CINOX model block 136.

Figure 5:
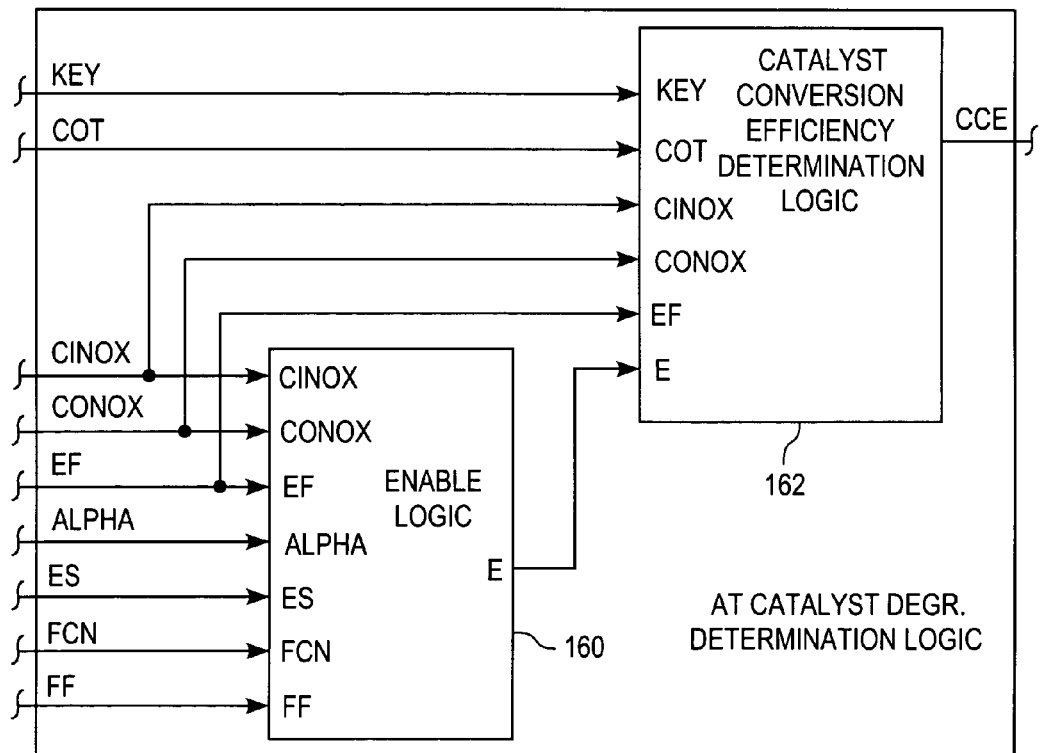
FIG. 5 is a block diagram of one illustrative embodiment of the aftertreatment catalyst degradation determination logic block of FIG. 2.

Referring now to FIG. 5, a block diagram of one illustrative embodiment of the aftertreatment catalyst degradation determination logic block 102 of FIG. 2 is shown. In the illustrated embodiment, the logic block 102 includes an enable logic block 160 receiving as inputs the catalyst inlet NOx value, CINOX, produced by the exhaust flow and catalyst inlet NOx determination logic block 100, the catalyst outlet NOx signal, CINOX, produced by the NOx sensor 76, the exhaust flow value, EF, produced by the exhaust flow and catalyst inlet NOx determination logic block 100, the ALPHA value generated internally to the control circuit 52, the engine speed signal, ES, produced by the engine speed sensor 60, the fuel consumed value, FCN, generated internally to the control circuit 52, and the fuel flow value, FF, produced by the fueling logic block 56. The enable logic block 60 is operable to process the foregoing input signals, and produce an enable signal, E. The aftertreatment catalyst degradation determination logic block 102 further includes a catalyst conversion efficiency determination logic block 162 receiving as inputs the key signal, KEY, produced by the key switch 80, the catalyst output temperature signal, COT, produced by the temperature sensor 72, the catalyst inlet NOx estimate, CINOX, produced by the exhaust flow and catalyst inlet NOx determination logic block 100, the catalyst outlet NOx signal, CONOX, produced by the NOx sensor 76, the exhaust flow value, EF, produced by the exhaust flow and catalyst inlet NOx determination logic block 100, and the enable signal, E, produced by the enable logic block 160. The catalyst conversion efficiency determination logic block 162 is operable to process the foregoing input signals and values and produce as an output the cumulative catalyst efficiency value, CCE.

Figure 6:
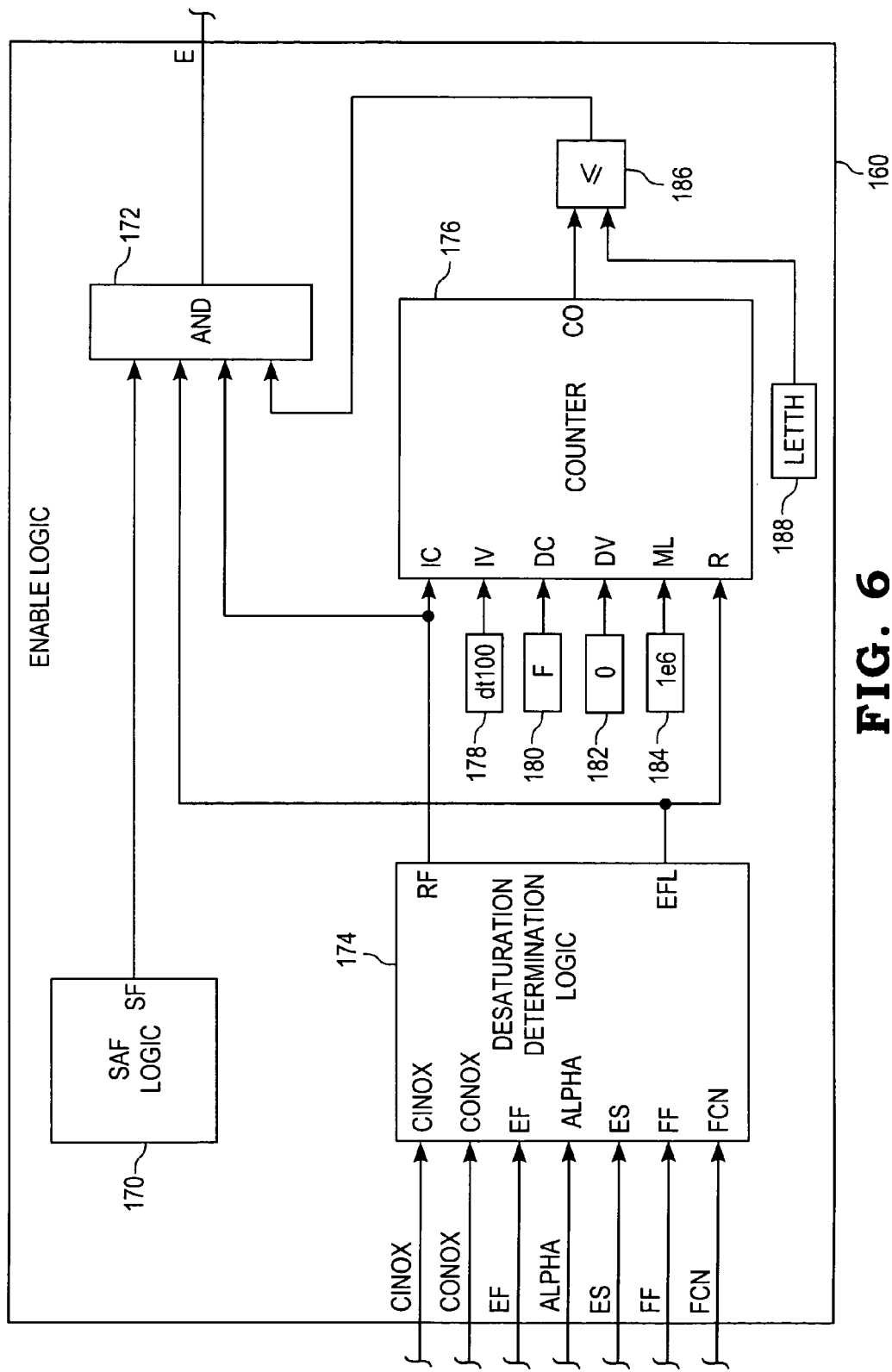
FIG. 6 is a block diagram of one illustrative embodiment of the enable logic block of FIG. 5.

Referring now to FIG. 6, a block diagram of one illustrative embodiment of the enable logic block 160 of FIG. 5 is shown. In the illustrated embodiment, the enable logic block 160 includes a sensor-actuator fault (SAF) logic block 170 providing a status flag, SF, to a first input of an AND block 172. The enable logic block 160 further includes a desaturation determination logic block 174 receiving as inputs the catalyst inlet NOx estimate, CINOX, the catalyst outlet NOx signal, CONOX, the exhaust flow value, EF, the ALPHA value, the engine speed signal, ES, the fuel flow rate value, FF, and the fuel consumed value, FCN. The desaturation determination logic block 174 is operable to process the foregoing input signals and produce a regeneration flag, RF, and an efficiency flag, EFL. The EFL value is provided to a second input of the AND block 172, and the RF value is provided to a third input of the AND block 172. The RF value is also provided to an increment condition, IC, input of a counter block 176, and the EFL value is provided to a reset, R, input of the counter block 176. An increment value, IV, input of the counter block 176 receives an increment value; e.g., dt100 stored in a memory block 178, and a decrement condition input, DC, receives a false value, F, stored in a memory block 180. A decrement value input, DV, of the counter block 176 receives a constant value; e.g., 0, stored in a memory block 182, and a maximum limit input, ML, receives a constant value; e.g., $1e^6$, stored in a memory block 184. A counter output, CO, is provided to one input of an arithmetic block 186, and a second input of the arithmetic block 186 receives a low efficiency timer threshold value, LETTH, stored in a memory block 188. In the illustrated embodiment, the arithmetic block 186 corresponds to a "less than or equal to" function producing a "1" or "true" output as long as the counter output, CO, is less than LETTH, and otherwise producing a "0" or "false" value. The output of the arithmetic block 186 is provided to a fourth input of the AND block 172. The output of the AND block 172 is the enable value, E, produced by the enable logic block 160.

Generally, the regeneration flag, RF, produced by the desaturation determination logic block 174 is set to "1" or "true" if regeneration of the aftertreatment component 138 has started. The desaturation determination logic block 174 is further operable, as will be described in greater detail hereinafter, to set the efficiency flag, EFL, to "1" or "true" if the current catalyst efficiency is sufficiently high, and otherwise sets EFL to "0" or "false." The enable logic block 160 is thus operable to set the enable value, E, to "1" or "true" if regeneration of the aftertreatment component 38 has started, there are no sensor or actuator faults, the current catalyst efficiency is greater than a calibrated value, and low efficiency does not last for more than low efficiency timer threshold value, LETTH. By producing a "true" enable signal E, only under such conditions, this avoids detecting a saturated NOx adsorber catalyst 40 as a degraded NOx adsorber catalyst 40.

Referring now to FIG. 7, a block diagram of one illustrative embodiment of the sensor-actuator fault logic block 170 of FIG. 6 is shown. In the illustrated embodiment, the control circuit 52 is operable, pursuant to one or more sensor and/or actuator fault determination algorithms, to determine operating statuses of the various sensors and actuators included within the system 10, and to store such sensor and actuator operating statues in memory blocks. For example, a memory block 190 contains a value, CONOXST, corresponding to the operational status of the catalyst outlet NOx sensor 76. A memory block 202 likewise contains a value, COTST, corresponding to the operating status of the catalyst outlet temperature sensor 72, a memory block 208 contains a value, MAFST, corresponding to the operational status of the mass airflow sensor 64, a memory block 214 contains a value, EGRVST, corresponding to the operational status of the EGR valve 46, and a memory block 232 contains a status value, ATST, corresponding to the operational status of the air intake throttle 50. Additional memory blocks 192, 204, 210, 228, and 234 all contain "good" values and corresponding arithmetic blocks 194, 206, 212, 230, and 236 are configured to compare the various sensor and actuator status values to the "good" values and produce corresponding output values to corresponding inputs of an AND block 238. If all of the sensor and actuator status values are "good," the status flag output, SF, of the AND block 238 will be "1" or "true." If, on the other hand, any one or more of the sensor and actuator operational status values are not "good," the AND block 238 will set the status flag, SF, to "0" or "false."

Referring now to FIG. 8, a block diagram of one illustrative embodiment of the desaturation determination logic block 174 of FIG. 6 is shown. In the illustrated embodiment, the desaturation determination logic block 174 includes a trigger logic block 240 receiving as inputs the fuel consumed value, FCN, the engine speed signal, ES, and the fuel flow rate value, FF. The output of the trigger logic block 240 is a trigger value, T, which is passed through a NOT block 242 and provided to one input of a latching logic block 244 having a second input receiving the ALPHA value. The output of the latching logic block 244 is the regeneration flag, RF, which is passed through a NOT block 246 and provided to one input of an OR block 248 having a second input receiving the ALPHA value. The output of the OR block 248 is provided to an ALPHA latch input, AL, of a lean cumulative NOx efficiency determination logic block 250. The logic block 250 further receives as inputs the catalyst inlet NOx value, CINOX, the catalyst outlet NOx value, CINOX, and the exhaust flow value, EF. The output of the lean catalyst NOx efficiency determination logic block 250 is a catalyst NOx efficiency value, CNE, which is provided to one input of an arithmetic block 252 having a second input receiving a de-NOx threshold value, DNTH, stored in a memory block 254. The output of the arithmetic logic block 252 is provided to one input of a latching logic block 256 having a second input receiving the output of the NOT block 242. The output of the latching logic block 250 is the efficiency flag, EFL. In the illustrated embodiment, the arithmetic logic block 252 corresponds to a "greater than or equal to" function, so that the output of the block 252 is "1" or "true" as long as CNE is greater than or equal to DNTH. Otherwise, the output of the block 252 is "0" or "false." The lean catalyst NOx efficiency determination logic block 250 is operable to determine a cumulative NOx efficiency, CNE, of the aftertreatment component 38 during each lean operation and when the NOx adsorber catalyst 40 is not saturated. The efficiency flag, EFL, is set to "1" or "true" when the cumulative NOx efficiency value, CNE, is greater than DNTH, and the latching logic block 256 has not been reset by the trigger value, T, produced by the NOT block 242.

Figure 9:
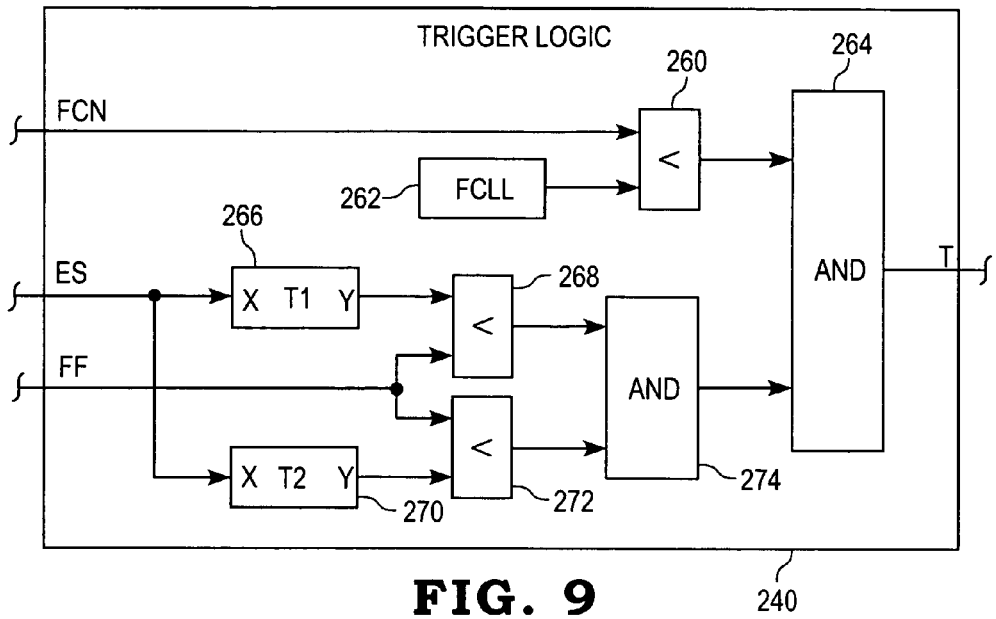
FIG. 9 is a block diagram of one illustrative embodiment of the trigger logic block of FIG. 8.

Referring now to FIG. 9, a block diagram of one illustrative embodiment of the trigger logic block 240 of FIG. 8 is shown. In the illustrated embodiment, the trigger logic block 240 includes an arithmetic logic block 260 having a first input receiving the fuel consumed value, FCN, a second input receiving a fuel consumed lower limit value, FCLL, stored in a memory block 262. The output of the arithmetic logic block 260 is provided to a first input of an AND block 264. In the illustrated embodiment, the arithmetic logic block 260 is a "less than" function. A first table 266 receives as an input the engine speed signal, ES, and its output is provided to a first input of an arithmetic logic block 268. The second input of the arithmetic logic block 268 receives the fuel flow rate value, FF, as does a first input of another arithmetic logic block 272. The second input of the arithmetic logic block 272 receives the output of a second table 270 receiving the engine speed signal, ES, as its input. The outputs of the arithmetic logic blocks 268 and 270 are provided as inputs to another AND block 274 providing its output to a second input of the AND block 264. The output of the AND block 264 is the trigger signal, T. In the illustrated embodiment, the arithmetic logic blocks 268 and 272 are both "less than" functions.

The first and second tables 266 and 270 each convert the engine speed signal to fuel flow rate limit values, wherein the first table 266 produces a lower fuel flow rate limit value and the second table 270 produces an upper fuel flow rate limit value. If the lower fuel flow rate limit value produced by the first table 266 is less than FF, the output of the arithmetic block 268 is "1" or "true", and is otherwise "0" or "false." Likewise, if FF is less than the upper fuel flow rate limit value produced by the second table 270, the output of the arithmetic block 272 is "1" or "true", and is otherwise "0" or "false." The output of the AND block 274 is thus "1" or "true" only if FF is between the upper and lower fuel flow rate limit values produced by the two tables 266 and 270, and is otherwise "0" or "false." The fuel consumed value, FCN is greater than or equal to FCLL only when regeneration of the aftertreatment component 38 has not occurred for a long time or the NAC 40 is saturated such as during a cold start. The trigger value, T, is thus "1" or "true" only when FCN is less than FCLL and FF is between the upper and lower fuel flow rate limit values produced by the two tables 266 and 270, and is otherwise "0" or "false."

Figure 10:
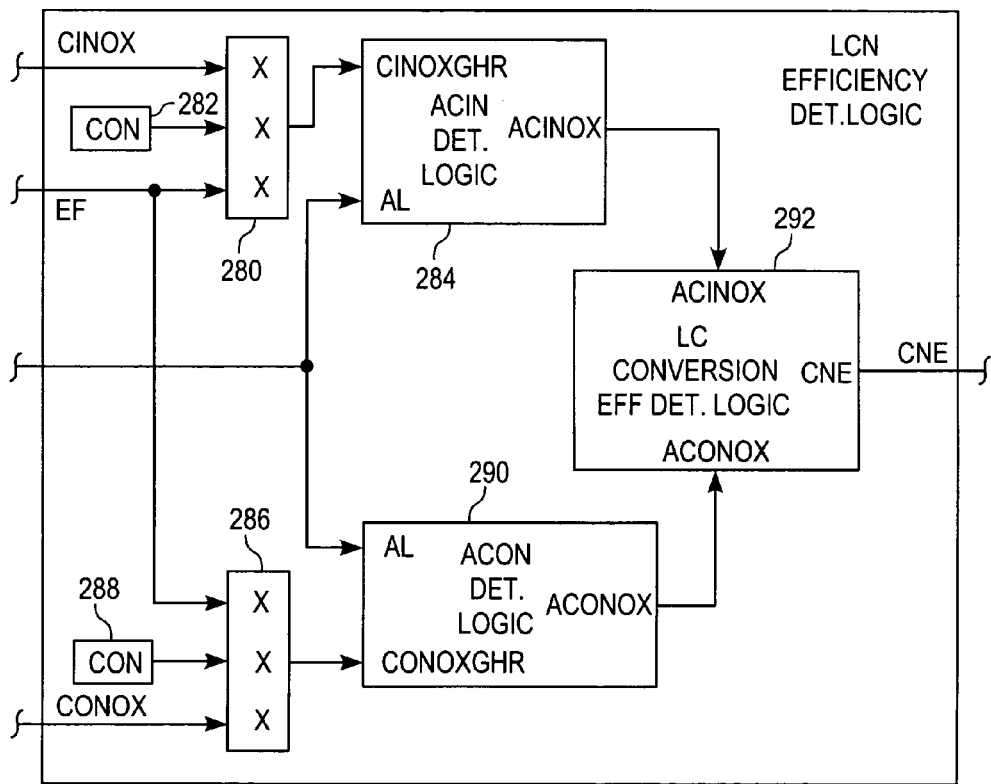
FIG. 10 is a block diagram of one illustrative embodiment of the lean cumulative NOx efficiency determination logic block of FIG. 8.

Referring now to FIG. 10, a block diagram of one illustrative embodiment of the lean cumulative NOx efficiency determination logic block 250 of FIG. 8 is shown. In the illustrated embodiment, the logic block 250 includes a multiplication block 280 having a first input receiving the catalyst inlet NOx value, CINOX, a second input receiving a constant, CON, stored in memory block 282, and a third input receiving the exhaust flow value, EF. The output of the arithmetic block 280 is a catalyst inlet NOx flow value, CINOXGHR, which corresponds to a flow rate of NOx into the inlet of the aftertreatment component 38. The constant value, CON, is a conversion factor; e.g., 0.001587, so that the catalyst inlet NOx flow value, CINOXGHR, is in units of grams per hour (g/hr). CINOXGHR and the alpha latch value, AL, are both provided as inputs to an accumulated catalyst inlet determination logic block 284. An accumulated catalyst inlet NOx output, ACINOX, of the logic block 284 is provided as an input to a lean cumulative conversion efficiency determination logic block 292. The lean cumulative efficiency determination logic block 250 further includes another multiplication block 286 having a first input receiving the exhaust flow value, EF, a second input receiving the constant value, CON, stored in a memory block 288, and a third input receiving the catalyst outlet NOx value, CONOX. The output of the multiplication block 286 is a catalyst outlet NOx flow value, CONOXGHR, corresponding to a flow rate of NOx exiting the aftertreatment component 38 in units of grams per hour (g/hr). CONOXGHR, along with the alpha latch value, AL, are provided as inputs to an accumulated catalyst outlet NOx determination logic block 290 producing as an output an accumulated catalyst outlet NOx value, ACONOX. The ACONOX value is provided as an input to the lean cumulative conversion efficiency determination logic block 292, which produces as an output the cumulative NOx efficiency value, CNE.

Figure 11:
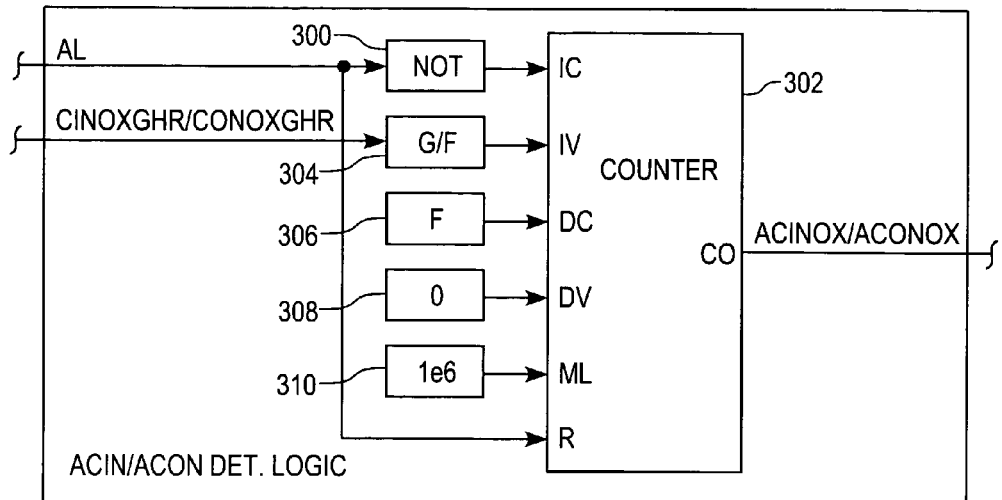
FIG. 11 is a block diagram of one illustrative embodiment of the accumulated catalyst inlet and accumulated catalyst outlet NOx determination logic blocks of FIG. 10.

Referring now to FIG. 11, a block diagram of one illustrative embodiment of either of the accumulated catalyst inlet and accumulated catalyst outlet NOx determination logic blocks 284 and 290 of FIG. 10 is shown. In the illustrated embodiment, the logic block 284, 290 includes a NOT block 300 receiving as an input the alpha latch value, AL, and the output of the NOT block is provided to an increment condition, IC, input of a counter block 302. The CINOXGHR value (logic block 284) or CONOXGHR value (logic block 290) is provided to a conversion block 304 that computes grams per hour (g/hr) to grams per frame (g/f). The output of the conversion block 304 is provided to an increment value input, IV, of the counter block 302. A decrement condition input, DC, of the counter block 302 receives a "false" input value stored in a memory block 306, and a decrement value input, DV, receives the value zero stored in a memory block 308. A maximum limit input, ML, of the counter block 302 receives a maximum counter limit value; e.g., $1e^6$, stored in a memory block 310. A reset input, R, of the counter block 302 receives the alpha latch value, AL. A counter output, CO, of the counter block 302 produces the accumulated catalyst inlet NOx value, ACINOX (for block 284), or the accumulated catalyst outlet NOx value, ACONOX, (for block 290). ACINOX corresponds to the amount of NOx accumulated at the inlet of the aftertreatment component 38 during a lean operation, and the accumulated catalyst outlet NOx value, ACONOX, corresponds to the NOx amount accumulated at the outlet of the aftertreatment component 38 during lean operation. Thus, when the aftertreatment component 38 is not regenerating and during lean operation, the counter block 302 incrementally accumulates the CINOXGHR or CONOXGHR values.

Figure 12:
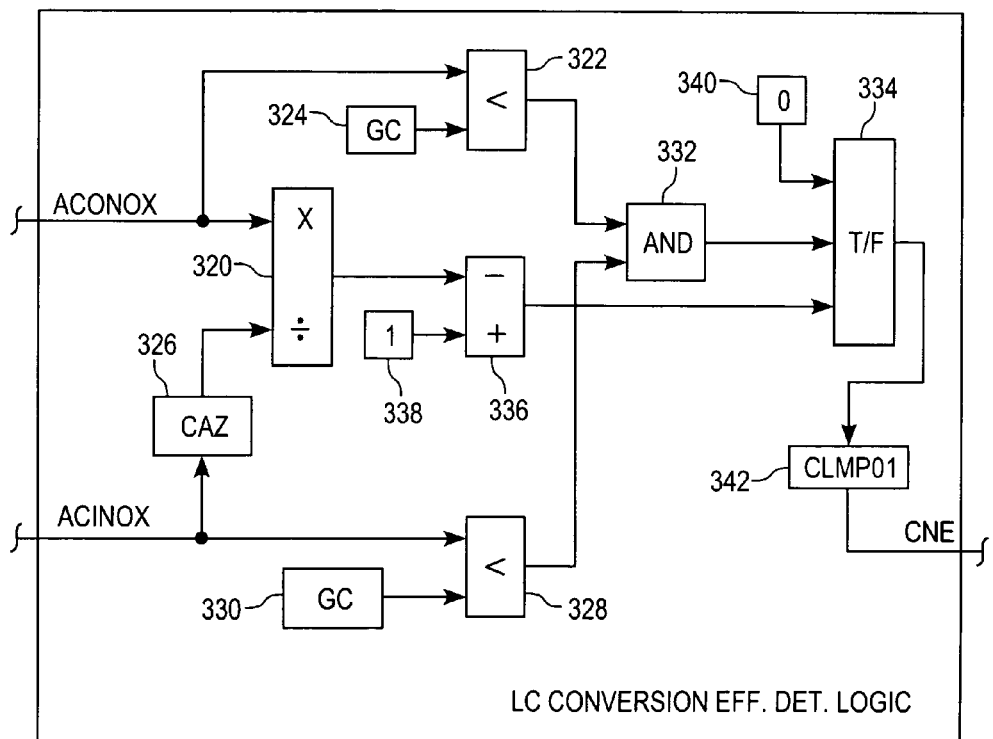
FIG. 12 is a block diagram of one illustrative embodiment of the lean catalyst conversion efficiency determination logic block of FIG. 10.

Referring now to FIG. 12, a block diagram of one illustrative embodiment of the lean catalyst conversion efficiency determination logic block 292 of FIG. 10 is shown. In the illustrated embodiment, the logic block 292 includes an arithmetic block 320 having a multiplication input receiving the accumulated catalyst outlet NOx value, ACONOX, which is also supplied to one input of another arithmetic block 322. A second input of the arithmetic block 322 receives a gram constant value, GC; e.g., 0.001, that is stored in a memory block 324. In the illustrated embodiment, the arithmetic function 322 is a "less than" function so that the output of the block 322 is "1" or "true" as long as ACONOX is less than GC, and is otherwise "0" or "false." The accumulated catalyst inlet NOx value, ACINOX, is supplied to an input of a clamp above zero (CAZ) block 326, and also to one input of an arithmetic block 328. A second input of the arithmetic block 328 receives a gram constant value, GC; e.g., 0.01, that is stored in a memory block 330. As with the arithmetic block 322, the arithmetic block 328 is a "less than" function so that the output of block 328 is "1" or "true" as long as ACINOX is less than GC, and is otherwise "zero" or "false."

The output of the clamp above zero block 326 is provided to a division input of the arithmetic block 320 so that the output of the block 320 is the ratio of ACONOX and ACINOX. This output is provided to a subtraction input of an arithmetic block 336 having an addition input receiving the value 1 that is stored in a memory block 338. The output of the arithmetic block 336, which corresponds to the value 1-ACONOX/ACINOX, is provided to a "false" input of a true/false block 334. The "true" input of the true/false block 334 receives the value zero that is stored in a memory block 340. The control input of the true/false block 334 is provided by the output of an AND block 332 having inputs receiving the output values of the arithmetic blocks 322 and 328. The output of the true/false block 334 is supplied to a clamp block 342 that clamps minimum and maximum values of the output to zero and one, respectively. The output of the clamp lock 342 is the cumulative NOx efficiency value (CNE).

As long as ACINOX and ACONOX are both less than the gram constant value; e.g., 0.001 gram, the cumulative NOx efficiency value, CNE, is zero. Conversely, when both ACINOX and ACONOX are both greater than or equal to GC, the accumulative NOx efficiency value, CNE, will be [1-ACONOX/ACINOX], clamped to a value between zero and one.

Figure 13:
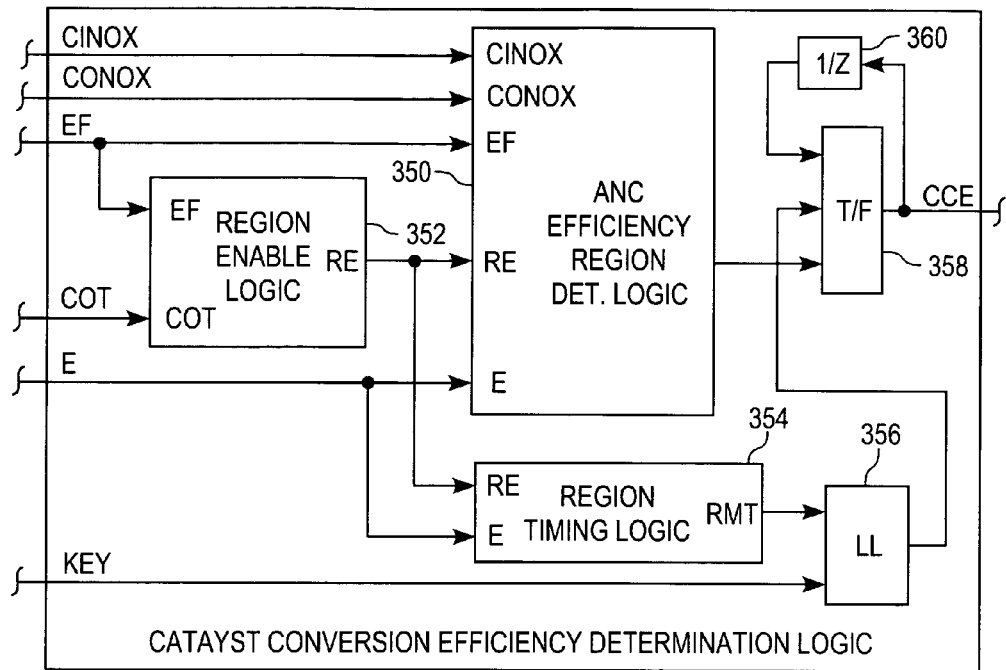
FIG. 13 is a block diagram of one illustrative embodiment of the catalyst conversion efficiency determination logic block of FIG. 5.

Referring now to FIG. 13, a block diagram of one illustrative embodiment of the catalyst conversion efficiency determination logic block 162 of FIG. 5 is shown. In the illustrated embodiment, the catalyst conversion efficiency determination logic block 162 includes an accumulated NOx conversion efficiency region determination logic block 350 receiving as inputs the catalyst inlet NOx value, CINOX, the catalyst outlet NOx value, CONOX, the exhaust flow value, EF, the enable value, E, produced by the enable logic block 160 of FIG. 5, and a region enable value, RE, produced by a region enable logic block 352. The region enable logic block 352 receives as inputs the exhaust flow value, EF, and the catalyst outlet temperature signal, COT, produced by the temperature sensor 72. The region enable logic block 352 is included to enable operation of the accumulated NOx conversion efficiency region determination logic block 350 only for a specifically defined region of exhaust flow and aftertreatment component outlet temperature as will be described in greater detail hereinafter with respect to FIG. 14. In any case, the region enable value, RE), and the enable value, E, are both provided as inputs to a region timing logic block 354 producing as an output a region monitoring time value, RMT, which is provided to one input of a latching logic block 356 having another input receiving the key switch signal, KEY. An output of the latching logic block 356 is provided as the control input to a true/false block 358 having a "false" input receiving the output of the accumulated NOx conversion efficiency region determination logic block 350, and a "true" input receiving the output of a delay block 360 having an input receiving the cumulative conversion efficiency value, CCE, which is the output of the true/false block 358. When exhaust flow, EF, and aftertreatment component outlet temperature, COT, conditions satisfy the criteria of the region enable logic block 352 and the enable value, E, is "true," the accumulated NOx conversion efficiency region determination logic block 350 is operable, and its output is latched to the output of the true/false block 358 when the key switch is "on" and the region monitoring time value, RMT, is "true."

Figure 14:
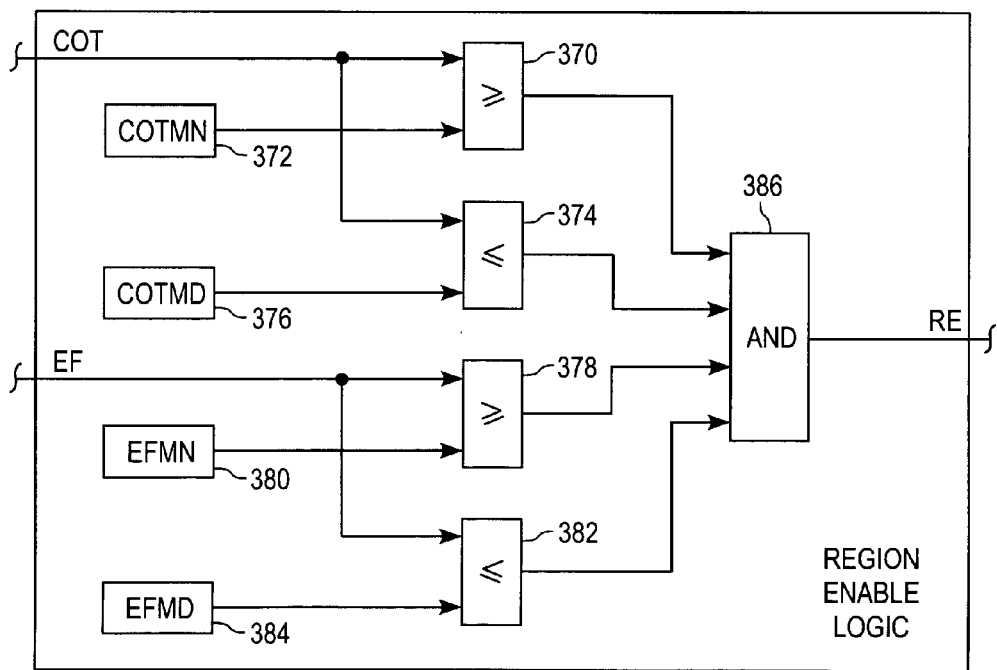
FIG. 14 is a block diagram of one illustrative embodiment of the region enable block of FIG. 13.

Referring now to FIG. 14, a block diagram of one illustrative embodiment of the region enable block 352 of FIG. 13 is shown. In the illustrated embodiment, the region enable logic block 352 includes an arithmetic block 370 having an input receiving the aftertreatment component outlet temperature signal, COT, produced by the temperature sensor 72, and a second input receiving a minimum COT value, COTMN, that is stored in a memory block 372. In the illustrated embodiment, the arithmetic block 370 is a "greater than or equal to" function so that the output of the arithmetic block 370 is "1" or "true" only when COT is greater than COTMN, and is otherwise "0" or "false." The region enable logic block 352 further includes an arithmetic block 374 having an input receiving the aftertreatment component outlet temperature signal, COT, produced by the temperature sensor 72, and a second input receiving a middle COT value, COTMD, that is stored in a memory block 376. In the illustrated embodiment, the arithmetic block 374 is a "less than or equal to" function so that the output of the arithmetic block 374 is "1" or "true" only when COTMD is greater than COT, and is otherwise "0" or "false." The region enable logic block 352 further includes an arithmetic block 378 having an input receiving the exhaust flow value, EF, and a second input receiving a minimum exhaust flow value, EFMN, that is stored in a memory block 380. In the illustrated embodiment, the arithmetic block 378 is a "greater than or equal to" function so that the output of the arithmetic block 378 is "1" or "true" only when EFMN is less than EF, and is otherwise "0" or "false." The region enable logic block 352 further includes an arithmetic block 382 having an input receiving the exhaust flow value, EF, and a second input receiving a middle exhaust flow value, EFMD, that is stored in a memory block 384. In the illustrated embodiment, the arithmetic block 382 is a "less than or equal to" function so that the output of the arithmetic block 382 is "1" or "true" only when EFMD is greater than EF, and is otherwise "0" or "false." The outputs of each of the arithmetic blocks 370, 374, 378, and 382 are provided to corresponding inputs of an AND block 386, the output of which is the region enable value, RE.

The region enable logic block 352 thus specifies a particular operating region of exhaust flow and catalyst outlet temperature for which the logic block 350 of FIG. 13 is operational. It will be understood that the region enable logic block 352 may alternatively be configured to define other regions of exhaust flow and catalyst outlet temperature at which the logic block 350 is operational. Alternatively or additionally, multiple catalyst conversion efficiency determination logic blocks 162 may be provided wherein each such logic block 162 determines a cumulative catalyst efficiency value, CCE, at a different specified region of exhaust flow and catalyst outlet temperature operation. Any such alternative embodiments would a mechanical step for a skilled artisan.

Figure 15:
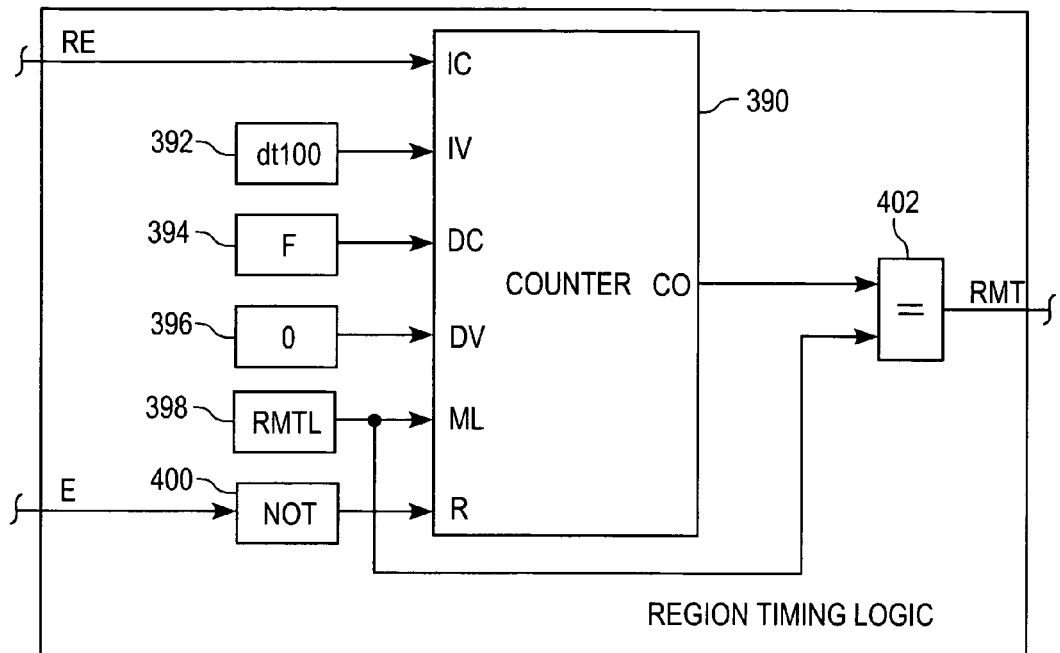
FIG. 15 is a block diagram of one illustrative embodiment of the region timing logic block of FIG. 13.

Referring now to FIG. 15, a block diagram of one illustrative embodiment of the region timing logic block 354 of FIG. 13 is shown. In the illustrated embodiment, the logic block 354 includes a counter block 392 having an increment condition input, IC, receiving the region enable value, RE, produced by the region enable logic block 352 of FIG. 13. An increment value input, IV, of the counter block 390 receives a counter increment value; e.g., dt100, stored in a memory block 392. A decrement condition input, DC, of the counter block 390 receives a "false" input value stored in a memory block 394, and a decrement value input, DV, receives the value zero stored in a memory block 396. A maximum limit input, ML, of the counter block 390 receives a region monitor time limit value, RMTL, stored in a memory block 398. The enable value, E, produced by the enable logic block 160 of FIG. 5 is passed through a NOT block 400 and then provided to a reset input, R, of the counter block 390. A counter output, CO, of the counter block 390 is provided to one input of an arithmetic block 402 having another input receiving the region monitor time limit value, RMTL. The output of the arithmetic block 402 is the region monitoring time value, RMT. In the illustrated embodiment, the arithmetic block 402 is an "equals" function so that RMT is "1" or "true" only when the counter block 390 reaches the region monitor time limit value, RMTL, and is otherwise "0" or "false."

Figure 16:
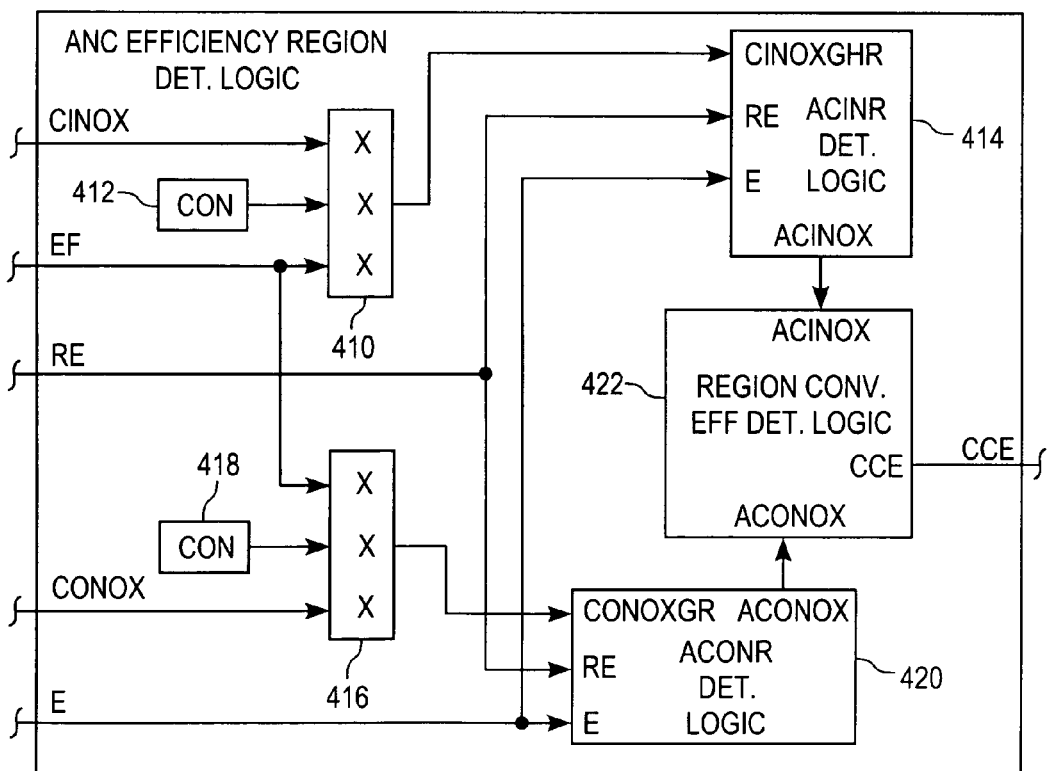
FIG. 16 is a block diagram of one illustrative embodiment of the accumulated NOx conversion efficiency region determination logic block of FIG. 13.

Referring now to FIG. 16, a block diagram is shown of one illustrative embodiment of the accumulated NOx conversion efficiency region determination logic block 350 of FIG. 13. In the illustrated embodiment, the logic block 350 includes a multiplication block 410 having a first input receiving the catalyst inlet NOx value, CINOX, a second input receiving a constant, CON, stored in memory block 412, and a third input receiving the exhaust flow value, EF. The output of the arithmetic block 410 is a catalyst inlet NOx flow value, CINOXGHR, which corresponds to a flow rate of NOx into the inlet of the aftertreatment component 38. The constant value, CON, is a conversion factor; e.g., 0.001587, so that the catalyst inlet NOx flow value, CINOXGHR, is in units of grams per hour (g/hr). CINOXGHR, the enable value, E, and the region enable value, RE, are all provided as inputs to an accumulated catalyst inlet NOx region determination logic block 414. An accumulated catalyst inlet NOx output, ACINOX, of the logic block 414 is provided as an input to a region conversion efficiency determination logic block 422. The accumulated NOx conversion efficiency region determination logic block 350 further includes another multiplication block 416 having a first input receiving the exhaust flow value, EF, a second input receiving the constant value, CON, stored in a memory block 418, and a third input receiving the catalyst outlet NOx value, CONOX. The output of the multiplication block 416 is a catalyst outlet NOx flow value, CONOXGHR, corresponding to a flow rate of NOx exiting the aftertreatment component 38 in units of grams per hour (g/hr). CONOXGHR, along with the region enable value, RE, and the enable value, E, are all provided as inputs to an accumulated catalyst outlet NOx region determination logic block 420 producing as an output an accumulated catalyst outlet NOx value, ACONOX. The ACONOX value is provided as an input to the region conversion efficiency determination logic block 422, which produces as an output the cumulative NOx conversion efficiency value, CCE. The region conversion efficiency determination logic block 422 is, in the illustrated embodiment, identical to the LC conversion efficiency determination logic block 292 of FIG. 12.

Figure 17:
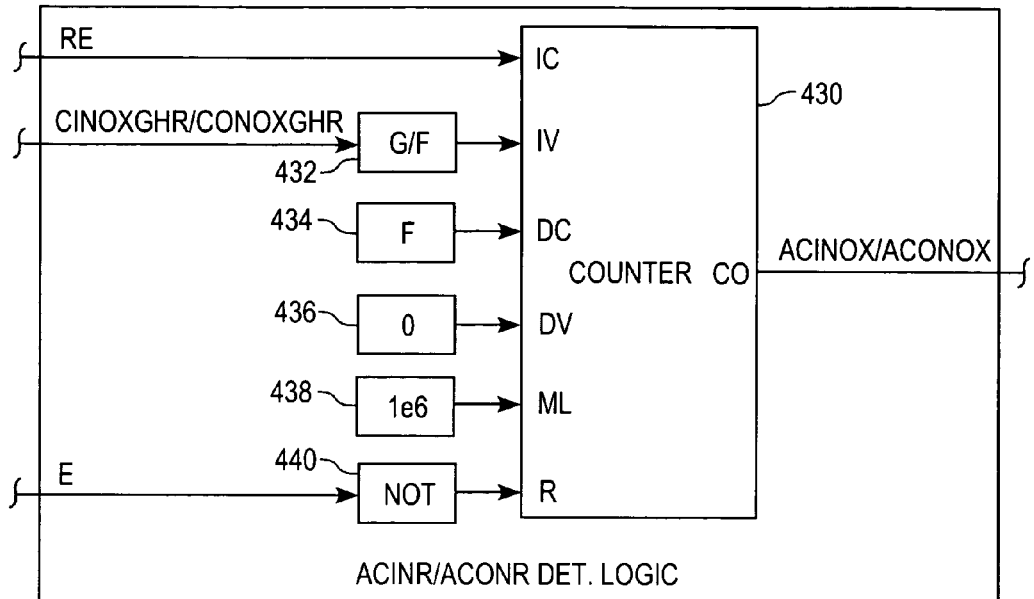
FIG. 17 is a block diagram of one illustrative embodiment of the accumulated catalyst inlet and accumulated catalyst outlet NOx region determination logic blocks of FIG. 16.

Referring now to FIG. 17, a block diagram is shown of one illustrative embodiment of either of the accumulated catalyst inlet NOx region or accumulated catalyst outlet NOx region determination logic block 414 or 420, respectively, of FIG. 16. In the illustrated embodiment, the logic block 414, 420 includes a counter block 430 having an increment condition input, IC, receiving the region enable value, RE. The CINOXGHR value (logic block 414) or CONOXGHR value (logic block 420) is provided to a conversion block 432 that computes grams per hour (g/hr) to grams per frame (g/f). The output of the conversion block 432 is provided to an increment value input, IV, of the counter block 430. A decrement condition input, DC, of the counter block 430 receives a "false" input value stored in a memory block 434, and a decrement value input, DV, receives the value zero stored in a memory block 436. A maximum limit input, ML, of the counter block 430 receives a maximum counter limit value; e.g., $1e^6$, stored in a memory block 438. The enable value, E, is passed through a NOT block 440 and then to a reset input, R, of the counter block 430. A counter output, CO, of the counter block 430 produces the accumulated catalyst inlet NOx value, ACINOX (for block 414), or the accumulated catalyst outlet NOx value, ACONOX, (for block 420). ACINOX corresponds to the amount of NOx accumulated at the inlet of the aftertreatment component 38 during the exhaust flow and catalyst outlet temperature conditions defining the region of interest, and the accumulated catalyst outlet NOx value, ACONOX, corresponds to the NOx amount accumulated at the outlet of the aftertreatment component 38 during the same conditions. Thus, when the aftertreatment component 38 is not regenerating and while operating in the region of interest, defined by the specified exhaust flow and catalyst outlet temperature parameters, the counter block 430 incrementally accumulates the CINOXGHR or CONOXGHR values.

Figure 18:
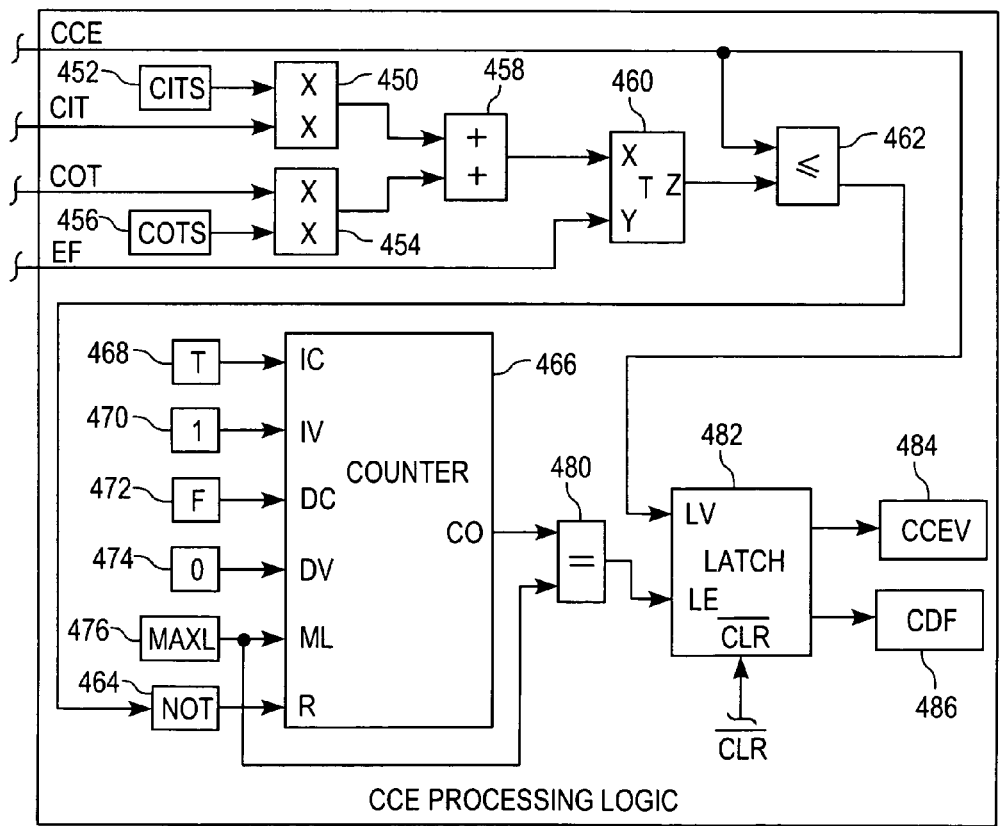
FIG. 18 is a block diagram of one illustrative embodiment of the cumulative catalyst efficiency processing logic block of FIG. 2.

Referring now to FIG. 18, a block diagram is shown of one illustrative embodiment of the cumulative conversion efficiency processing logic block 104 of FIG. 2. In the illustrated embodiment, the logic block 104 includes a multiplication block 450 having one input receiving the catalyst inlet temperature signal, CIT, produced by the temperature sensor 68 and another input receiving a catalyst inlet temperature scale value, CITS, that is stored in a memory block 452. Another multiplication block 454 has one input receiving the catalyst outlet temperature signal, COT, produced by the temperature sensor 72, and another input receiving a catalyst outlet temperature scale value, COTS, that is stored in a memory block 456. The outputs of the multiplication blocks 450 and 454 are provided to a summation block 458 having an output that produces a temperature value corresponding to the catalyst bed temperature, which is the internal operating temperature of the aftertreatment component 38. In any case, the output of the summation block 458 is provided to one input; e.g., an "X" input, of a table 460. In an alternative embodiment, blocks 450-458 may be omitted, and the catalyst outlet temperature signal, COT, may be provided directly to the "X" input of the table 460. In either case, the table 460 further includes a "Y" input receiving the exhaust flow value, EF. The table 460 is configured to convert the temperature value, i.e., the catalyst bed temperature as illustrated or alternatively the catalyst outlet temperature, and the exhaust flow values to a cumulative conversion efficiency threshold value, which is provided by a "Z" output of the table 460 to one input of an arithmetic block 462 having another input receiving the cumulative catalyst efficiency value, CCE, produced by the aftertreatment catalyst degradation determination logic block 102. In the illustrated embodiment, the arithmetic block 462 is a "less than or equal to" function so that the output of the arithmetic block 462 is "1" or "true" only if the cumulative conversion efficiency value, CCE, is less than the cumulative conversion efficiency threshold value produced at the "Z" output of the table 460, and is otherwise "0" or "false."

The output of the arithmetic block 462 is provided to an input of a NOT block 464, the output of which is provided to a reset, R, input of a counter block 466. An increment counter input, IC, of the counter block 466 receives a "true" value stored in a memory block 468, an increment value input, IV, of the counter block 466 receives the value "1" that is stored in a memory block 470, a decrement counter input, DC, of the counter block 466 receives a "false" value that is stored in a memory block 472, and a decrement value input, DV, of the counter block 466 receives a value of zero that is stored in a memory block 474. A maximum limit input, ML, of the counter block 466 receives a maximum limit value, MAXL, that is stored in a memory block 476. In one embodiment, the maximum counter limit, MAXL, is set to a value that results in a desired time duration that it takes for the counter block 466 to count from its reset state to the maximum counter limit, MAXL.

A counter output, CO, of the counter block 466 is provided to one input of an arithmetic block 480 having a second input receiving the maximum counter limit value, MAXL, that is stored in the memory block 476. In the illustrated embodiment, the arithmetic block 480 is an "equals" function so that the output of the block 480 is "1" or "true" only when the counter output, CO, reaches the maximum counter value, MAXL, and is otherwise "0" or "false." The output of the arithmetic block 480 is provided to a latch enable input, LE, of a latch block 482 having a latch value input, LV, receiving the cumulative catalyst efficiency value, CCE. The latch block 482 further includes a clear input, CLR', receiving an internally generated clear signal, CLR', which may be generated by a service or recalibration tool or the like. When enabled by the output of the arithmetic block 482, the latch logic block 482 is operable to log a catalyst degraded fault, CDF, in a memory location 486. Alternatively or additionally, the latch circuit 482 may, when enabled by the output of the arithmetic block 482, capture the most recent cumulative conversion efficiency value, CCE, in a memory location 484. Thus, the cumulative catalyst efficiency processing logic block 104 is operable to log a catalyst degraded fault and/or capture the most recent cumulative catalyst efficiency value, if the cumulative catalyst efficiency value, CCE, is less than or equal to a threshold cumulative catalyst efficiency value for at least a time period defined by the counter block 466.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A system for diagnosing operation of an exhaust gas aftertreatment component for an internal combustion engine, the system comprising:
   a NOx sensor producing a NOx signal indicative of NOx content of exhaust gas exiting the aftertreatment component, and
   a control circuit estimating as a function of a number of engine operating conditions a NOx inlet content corresponding to a NOx content of exhaust gas produced by the engine and entering the aftertreatment component, the control circuit determining a lean NOx conversion efficiency of the aftertreatment component as a function of the NOx signal and of the NOx inlet content and determining that the aftertreatment component is not saturated if the lean NOx conversion efficiency is greater than a first minimum efficiency value and the lean NOx conversion efficiency does not drop below a second minimum efficiency value for more than a first predefined time period, the control circuit responsive to an indicator indicating that regeneration of the aftertreatment component is occurring to determine a NOx conversion efficiency of the aftertreatment component as a function of the NOx signal and of the NOx inlet content and to determine that the aftertreatment component is degraded if the NOx conversion efficiency is below a threshold value, only if the aftertreatment component is not saturated.

2. The system of claim 1 further including:
   an engine speed sensor producing an engine speed signal indicative of rotational speed of the engine,
   a mass air flow sensor producing a mass air flow signal indicative of a mass flow of fresh air entering the engine,
   an intake manifold coupled to the engine,
   an exhaust manifold coupled to the engine, and an EGR conduit fluidly coupled between the exhaust manifold and the intake manifold,
   wherein the control circuit is configured to estimate the NOx inlet content as a function of the engine speed signal, the mass air flow signal, a flow rate of fuel supplied to the engine, a fuel timing value and an EGR flow rate value indicative of a flow rate of recirculated exhaust gas through the EGR conduit.

3. The system of claim 1 further including:
   an engine speed sensor producing an engine speed signal indicative of rotational speed of the engine,
   a mass air flow sensor producing a mass air flow signal indicative of a mass flow of fresh air entering the engine, and
   a pressure sensor producing a pressure signal indicative of ambient air pressure,
   wherein the control circuit is configured to estimate the NOx inlet content as a function of the engine speed signal, the mass air flow signal, the pressure signal, a flow rate of fuel supplied to the engine, and a fuel timing signal.

4. The system of claim 1 wherein the control circuit is configured to determine the NOx conversion efficiency further as a function of a flow rate of the exhaust gas entering the aftertreatment component.

5. The system of claim 4 further including:
   an engine speed sensor producing an engine speed signal indicative of rotational speed of the engine, and
   a mass air flow sensor producing a mass air flow signal indicative of a mass flow of fresh air entering the engine,
   wherein the control circuit is configured to determine the flow rate of the exhaust gas entering the aftertreatment component as a function of the engine speed signal, the mass air flow signal and a flow rate of fuel supplied to the engine.

6. The system of claim 1 wherein the control circuit is configured to determine that the aftertreatment component is degraded only if the NOx conversion efficiency is below the threshold value for at least a second predefined time period.

7. The system of claim 6 wherein the control circuit is configured to determine the NOx conversion efficiency of the aftertreatment component by determining from the NOx signal an accumulated aftertreatment component outlet NOx quantity over a third predefined time period, determining from the NOx inlet content an accumulated aftertreatment component inlet NOx quantity over the third predefined time period, and determining the NOx conversion efficiency as a function of a ratio of the accumulated aftertreatment component outlet NOx quantity and the accumulated aftertreatment component inlet NOx quantity.

8. The system of claim 7 wherein the control circuit is configured to determine the accumulated aftertreatment component outlet NOx quantity as a function of the NOx signal and of a flow rate of exhaust gas entering the aftertreatment component over the third predefined time period, and to determine the accumulated aftertreatment component inlet NOx quantity as a function of the NOx inlet content and of the flow rate of exhaust gas entering the aftertreatment component over the third predefined time period.

9. The system of claim 8 further including:
   an engine speed sensor producing an engine speed signal indicative of rotational speed of the engine, and
   a mass air flow sensor producing a mass air flow signal indicative of a mass flow of fresh air entering the engine,
   wherein the control circuit is configured to determine the flow rate of the exhaust gas entering the aftertreatment component as a function of the engine speed signal, the mass air flow signal and a flow rate of fuel supplied to the engine.

10. The system of claim 1 wherein the control circuit is configured to determine whether the NOx sensor is faulty and to determine whether any sensor producing sensory information from which the NOx inlet content is estimated is faulty, and to thereafter determine the NOx conversion efficiency of the aftertreatment component and determine whether the aftertreatment component is degraded only if the NOx sensor is not faulty and no sensor producing sensory information from which the NOx inlet content is estimated is faulty.

11. The system of claim 1 further including a temperature sensor producing a temperature signal indicative of a temperature of exhaust gas exiting the aftertreatment component,
   and wherein the control circuit is configured to determine the NOx conversion efficiency of the aftertreatment component and determine whether the aftertreatment component is degraded only if the temperature signal indicates that the temperature of the exhaust gas exiting the aftertreatment component is within a predefined temperature range and a flow rate of exhaust gas entering the aftertreatment component is within a predefined flow rate range.

12. A system for diagnosing operation of an exhaust gas aftertreatment component for an internal combustion engine, the system comprising:
   a NOx sensor producing a NOx signal indicative of NOx content of exhaust gas exiting the aftertreatment component, an aftertreatment component inlet temperature sensor producing an inlet temperature signal indicative of a temperature of exhaust gas entering the aftertreatment component, an aftertreatment component outlet temperature sensor producing an outlet temperature signal indicative of a temperature of exhaust gas exiting the aftertreatment component, and a control circuit estimating as a function of a number of engine operating conditions a NOx inlet content corresponding to a NOx content of exhaust gas produced by the engine and entering the aftertreatment component, the control circuit determining a bed temperature of the aftertreatment component as a function of the temperature inlet signal and of the temperature outlet signal, determining a threshold value as a function of the bed temperature of the aftertreatment component and of a flow rate of exhaust gas entering the aftertreatment component, determining a NOx conversion efficiency of the aftertreatment component as a function of the NOx signal and of the NOx inlet content and determining that the aftertreatment component is degraded if the NOx conversion efficiency is below the threshold value.

13. The system of claim 12 further including:
an engine speed sensor producing an engine speed signal indicative of rotational speed of the engine, and
a mass air flow sensor producing a mass air flow signal indicative of a mass flow of fresh air entering the engine,
wherein the control circuit is configured to determine the flow rate of exhaust gas entering the aftertreatment component as a function of the engine speed signal, the mass air flow signal and a flow rate of fuel supplied to the engine.

14. The system of claim 1 further including a memory, wherein the control circuit is configured to log a fault in the memory after determining that the aftertreatment component is degraded.

15. The system of claim 14 wherein the control circuit is configured to store the NOx conversion efficiency in the memory after determining that the aftertreatment component is degraded.

16. A system for diagnosing operation of an exhaust gas aftertreatment component for an internal combustion engine, the system comprising:
a NOx sensor producing a NOx signal indicative of NOx content of exhaust gas exiting the aftertreatment component, and
a control circuit including a memory having stored therein instructions executable by the control circuit to estimate as a function of a first set of engine operating conditions a NOx inlet content corresponding to a NOx content of exhaust gas produced by the engine and entering the aftertreatment component, to estimate as a function of a second set of engine operating conditions an exhaust flow rate corresponding to a flow rate of exhaust gas produced by the engine and flowing through the aftertreatment component, to compute as a function of the NOx inlet content and the exhaust flow rate over a first time period an accumulated inlet NOx value corresponding to an amount of NOx accumulated at the inlet of the aftertreatment component during the first time period, to compute as a function of the NOx signal and the exhaust flow rate over the first time period an accumulated outlet NOx value corresponding to an amount of NOx accumulated at the outlet of the aftertreatment component during the first time period, to determine a NOx conversion efficiency of the aftertreatment component as a function of a ratio of the accumulated outlet NOx value and the accumulated inlet NOx value, and to determine that the aftertreatment component is degraded if the NOx conversion efficiency is below a threshold value.

17. The system of claim 16 wherein the instructions stored in the memory include instructions executable by the control circuit to determine that the aftertreatment component is degraded if the NOx conversion efficiency is below a threshold value for at least a second time period.

18. The system of claim 16 further comprising a temperature sensor producing a temperature signal indicative of a temperature of exhaust gas exiting the aftertreatment component,
and wherein the instructions stored in the memory further include instructions executable by the control circuit to determine the NOx conversion efficiency of the aftertreatment component only if the temperature signal is within a predefined temperature range and the exhaust flow rate is within a predefined flow rate range.

19. The system of claim 16 wherein the instructions stored in the memory further include instructions executable by the control circuit to determine the threshold value as a function of a bed temperature of the aftertreatment component and of the exhaust flow rate.

20. The system of claim 19 further comprising:
an aftertreatment component inlet temperature sensor producing an inlet temperature signal indicative of a temperature of exhaust gas entering the aftertreatment component, and
an aftertreatment component outlet temperature sensor producing an outlet temperature signal indicative of a temperature of exhaust gas exiting the aftertreatment component,
wherein the instructions stored in the memory further include instructions executable by the control circuit to determine the bed temperature of the aftertreatment component as a function of the temperature inlet signal and of the temperature outlet signal.

\* \* \* \* \*